(12) United States Patent
Ogawa et al.

(10) Patent No.: US 8,843,274 B2
(45) Date of Patent: Sep. 23, 2014

(54) SUSPENSION DEVICE

(75) Inventors: Atsushi Ogawa, Nagoya (JP); Taisuke Hayashi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 49 days.

(21) Appl. No.: 13/696,969

(22) PCT Filed: May 11, 2010

(86) PCT No.: PCT/JP2010/058250
§ 371 (c)(1),
(2), (4) Date: Nov. 8, 2012

(87) PCT Pub. No.: WO2011/142039
PCT Pub. Date: Nov. 17, 2011

(65) Prior Publication Data
US 2013/0060422 A1    Mar. 7, 2013

(51) Int. Cl.
B60G 17/018    (2006.01)
B60G 17/08    (2006.01)
B60G 13/02    (2006.01)

(52) U.S. Cl.
CPC ............ B60G 13/02 (2013.01); *B60G 2202/20* (2013.01); B60G 17/08 (2013.01); *B60G 2300/60* (2013.01)
USPC .......................................................... 701/37

(58) Field of Classification Search
USPC .......................................................... 701/37
See application file for complete search history.

(56) References Cited

U.S. PATENT DOCUMENTS

| | | | |
|---|---|---|---|
| 7,005,816 B2 * | 2/2006 | Hio et al. | 318/375 |
| 7,168,720 B2 * | 1/2007 | Fontdecaba Buj | 280/124.159 |
| 7,270,335 B2 * | 9/2007 | Hio et al. | 280/5.5 |
| 7,537,097 B2 * | 5/2009 | Suda et al. | 188/267 |
| 7,614,027 B2 * | 11/2009 | Farrar | 716/126 |
| 7,722,056 B2 * | 5/2010 | Inoue et al. | 280/5.512 |
| 7,828,125 B2 * | 11/2010 | Sekiya et al. | 188/267 |
| 7,938,410 B2 * | 5/2011 | Buma et al. | 280/5.508 |
| 8,103,408 B2 * | 1/2012 | Inoue et al. | 701/37 |
| 8,321,087 B2 * | 11/2012 | Hayashi et al. | 701/37 |

(Continued)

FOREIGN PATENT DOCUMENTS

| | | |
|---|---|---|
| JP | 3722128 B2 | 11/2005 |
| JP | 2006-62550 A | 3/2006 |
| JP | 2006-137280 A | 6/2006 |
| JP | 2008-62895 A | 3/2008 |
| JP | 2009-27871 A | 2/2009 |
| JP | 2009-29368 A | 2/2009 |
| JP | 2009-257486 A | 11/2009 |
| WO | 2011/004471 A1 | 1/2011 |

*Primary Examiner* — James Trammell
*Assistant Examiner* — Michael Berns
(74) *Attorney, Agent, or Firm* — Sughrue Mion, PLLC

(57) ABSTRACT

A suspension apparatus 1 includes an electric shock absorber 30 having a motor 40 and a ball screw mechanism 35, an electric circuit 101, an inverting amplification circuit 120, and an inertia compensation capacitor Cp. The electric circuit 101 electrically connects the two electricity supply terminals of the motor 40. The inverting amplification circuit 120 is connected to the electric circuit 101. The inertia compensation capacitor Cp is connected to the output terminal O of the inverting amplification circuit 120. As a result of approaching or separating motion between sprung and unsprung members, not only a generated current but also an inertia corresponding current $I_m$ which represents an inertial force of a rotation body, such as the ball screw shaft 36 and the rotor of the motor 40, flows through the motor 40 and the electric circuit 101. A current $I_p$ which is antiphase to the inertia corresponding current $I_m$ flows through the inertia compensation capacitor Cp. This antiphase current $I_p$ cancels out the inertia corresponding current $I_m$.

7 Claims, 20 Drawing Sheets

(56) References Cited

U.S. PATENT DOCUMENTS

| | | | |
|---|---|---|---|
| 8,525,453 B2 * | 9/2013 | Ogawa | 318/368 |
| 8,556,273 B2 * | 10/2013 | Ogawa | 280/5.506 |
| 8,596,430 B2 * | 12/2013 | Ogawa | 188/267 |
| 2004/0154886 A1 | 8/2004 | Hio et al. | |
| 2007/0170024 A1 * | 7/2007 | Suda et al. | 188/267 |
| 2008/0211153 A1 | 9/2008 | Sekiya et al. | |
| 2009/0079145 A1 * | 3/2009 | Inoue et al. | 280/5.515 |
| 2009/0224502 A1 * | 9/2009 | Yamawaki et al. | 280/124.108 |
| 2009/0273147 A1 * | 11/2009 | Inoue et al. | 280/5.51 |
| 2010/0013174 A1 * | 1/2010 | Buma et al. | 280/5.507 |
| 2012/0013277 A1 | 1/2012 | Ogawa | |

* cited by examiner

SUSPENSION DEVICE

CROSS REFERENCE TO RELATED APPLICATIONS

This application is a National Stage of International Application No. PCT/JP2010/058250 filed May 11, 2010, the contents of all which are incorporated herein by reference in their entirety.

TECHNICAL FIELD

The present invention relates to a suspension device or apparatus of a vehicle. In particular, the present invention relates to a suspension apparatus having a shock absorber which generates a damping force through use of a motor torque generated by a motor.

BACKGROUND ART

In general, a suspension apparatus of a vehicle includes a shock absorber and a spring member which are disposed between sprung and unsprung members of the vehicle. The spring member generates an elastic force, and the shock absorber generates a damping force. The damping force damps vibrations between the sprung member (a member mounted on the vehicle body side) and the unsprung member (a member mounted on the wheel side) which are caused by approaching and separating motions between the sprung member and the unsprung member.

There has been known a shock absorber in which a motor is used. The motor of this shock absorber includes a stator connected to one of the sprung and unsprung members, and a rotor which rotates in relation to the stator. This shock absorber may have a motion conversion mechanism which converts the approaching and separating motions between the sprung and unsprung members to a rotational motion and transmits the resultant rotational motion to the rotor.

According to this shock absorber, when the sprung and unsprung members approach and separate from each other, the rotor of the motor is caused to rotate in relation to the stator via, for example, the above-described motion conversion mechanism. An inductive electromotive force (counter electromotive force) is generated as a result of rotation of the rotor. An induced current (generated current) flows through the motor as a result of generation of the inductive electromotive force. As a result of the generated current flowing through the motor, there is generated a motor torque which acts in a direction opposite the rotation direction of the rotor. Such motor torque is used as the damping force.

Japanese Patent Application Laid-Open (kokai) No. 2009-257486 discloses a vibration system which includes a main vibration system and an additional vibration system added thereto, wherein the main vibration system and the additional vibration system vibrate in a direction in which they approach and separate from each other. The additional vibration system includes a motor and a ball screw mechanism (motion conversion mechanism). In addition, an RLC series circuit is connected to the motor for causing the generated current to flow through the motor. By use of the RLC series circuit, the inertial force, viscous force, and elastic force of this vibration system are represented.

DISCLOSURE OF THE INVENTION

FIG. 19 is a gain diagram showing characteristics regarding the transfer, to a sprung member, of vibration input to a vehicle from a road surface on which the vehicle is traveling (sprung vibration transfer characteristic). FIG. 20 is an enlarged diagram of a portion P of FIG. 19. In these diagrams, a curve A represents the sprung vibration transfer characteristic in the case of using a shock absorber having a motor (hereinafter, such a shock absorber will be referred to as an electric shock absorber). A curve B represents the sprung vibration transfer characteristic in the case of using a conventionally used shock absorber utilizing fluid viscosity (hereinafter, such a shock absorber will be referred to as a conventional shock absorber).

These diagrams show that, at or near a sprung resonance frequency (at or near 1 Hz), substantially the same sprung vibration transfer characteristic is attained in both the case where the electric shock absorber is used (curve A) and the case where the conventional shock absorber is used (curve B). In contrast, at or near an unsprung resonance frequency (at or near 10 Hz), the sprung vibration transfer characteristics attained in the case where the electric shock absorber is used (curve A) differs from that attained in the case where the conventional shock absorber is used (curve B). At or near the unsprung resonance frequency, the transmissibility of vibration to the sprung member (gain) in the case where the electric shock absorber is used is greater than that in the case where the conventional shock absorber is used. When the transmissibility of vibration to the sprung member is large, the vibration input from the road surface is transferred to the sprung member in a greater amount. This means that use of an electric shock absorber deteriorates the damping force characteristic in the unsprung resonance frequency band, to thereby deteriorate the riding quality of the vehicle.

The equations of motion of a vibration system formed by a sprung member; an unsprung member; and a conventional shock absorber and a spring member disposed between the two members are expressed by the following expressions (1) and (2).

$$Z_u'' = \frac{K_s}{M_u}(Z_w - Z_u) + \frac{C_0}{M_u}(Z_w' - Z_u') \quad (1)$$

$$Z_w'' = \frac{K_s}{M_w}(Z_u - Z_w) + \frac{K_t}{M_w}(Z_r - Z_w) + \frac{C_0}{M_u}(Z_u' - Z_w') \quad (2)$$

In the expressions (1) and (2), $M_u$ is the mass of the sprung member, $K_s$ is the spring constant of the spring member, $C_o$ is a damping coefficient, $K_t$ is the elastic constant of a tire, $Z_u$ is the vertical displacement of the sprung member, $Z_u'$ is the vertical speed of the sprung member, $Z_u''$ is the vertical acceleration of the sprung member, $Z_w$ is the vertical displacement of the unsprung member, $Z_w'$ the vertical speed of the unsprung member, $Z_w''$ is the vertical acceleration of the unsprung member, and $Z_r$ is the vertical displacement of the road surface.

Meanwhile, the equations of motion of a vibration system formed by a sprung member; an unsprung member; and an electric shock absorber and a spring member disposed between the two members are expressed by the following expressions (3) and (4).

$$Z_u'' = J\left[\frac{2\pi}{N}\right]^2 (Z_w'' - Z_u'') + \frac{K_s}{M_u}(Z_w - Z_u) + \frac{C_0}{M_u}(Z_w' - Z_u') \quad (3)$$

-continued $$Z_w'' = \qquad (4)$$
$$-J\left[\frac{2\pi}{N}\right]^2 (Z_w'' - Z_u'') + \frac{K_s}{M_w}(Z_u - Z_w) + \frac{K_t}{M_w}(Z_r - Z_w) + \frac{C_o}{M_u}(Z_u' - Z_w')$$

In the expressions (3) and (4), J is the inertial moment of a rotation body (e.g., the rotor of a motor) which is incorporated into the electric shock absorber and which rotates as a result of approaching and separating motions between the sprung and unsprung members. [$2\pi/N$] is the ratio (speed reduction ratio) between the amount of extension/contraction of the electric shock absorber and the amount of rotation (rotational angle) of the rotation body. For example, in the case where the electric shock absorber includes a ball screw mechanism as a motion conversion mechanism, N corresponds to the lead of the ball screw shaft. The first terms of the right sides of the expressions (3) and (4) represent the inertial force of the rotation body.

As can be understood from comparison between the expressions (1) and (3) and between the expressions (2) and (4), the equations of motion of the vibration system including an electric shock absorber differ from those of the vibration system including a conventional shock absorber, only in that the equations of motion of the vibration system including an electric shock absorber contain the terms regarding the inertia of the rotation body. That is, in the case where an electric shock absorber is used, as a result of the influence of the inertial force of the rotation body on the damping force, the vibration transfer characteristic at or near the unsprung resonance frequency deteriorates as shown in FIGS. 19 and 20. Since the mass of the rotation body is close to that of the unsprung member, the influence of the mass of the rotation body on vibrations at or near the unsprung resonance frequency is large, which conceivably deteriorates the vibration transfer characteristic at or near the unsprung resonance frequency.

The present invention has been accomplished so as to solve the above-described problem, and its object is to provide a suspension apparatus in which an electric shock absorber is used and which has an improved sprung vibration transfer characteristic at or near the unsprung resonance frequency.

A suspension apparatus of the present invention comprises a shock absorber which includes a motor having a stator coupled with one of sprung and unsprung members of the vehicle, and a rotor rotatable in relation to the stator, wherein, due to an inductive electromotive force generated when the rotor is rotated as a result of approaching and separating motions between the sprung and unsprung members, an induction current flows through the motor, whereby a damping force is generated; an electric circuit which establishes electrical connection between two electricity supply terminals of the motor; and an electrical characteristic adjustment part which adjusts an electrical characteristic of the electric circuit so as to reduce an inertia corresponding current which is a current flowing through the motor and which represents an inertial force of a rotation body which includes at least the rotor and which rotates as a result of the approaching and separating motions between the sprung and unsprung members.

According to the suspension apparatus of the present invention, when the sprung member and the unsprung member approach or separate, this approaching or separating motion causes the rotor to rotate in relation to the stator. When the rotor rotates in relation to the stator, due to electromagnetic induction, an inductive electromotive force (counter electromotive force) is generated. Due to the inductive electromotive force, an induction current (generated current) flows through the motor (through the coils of the motor). This generated current flows to the electric circuit which electrically connects the two electricity supply terminals of the motor. As a result of the generated current flowing through the motor and the electric circuit, there is produced a motor torque which acts in the direction opposite the rotation direction of the rotor. This motor torque serves as a damping force against vibrations between the sprung member and the unsprung member generated as a result of approaching and separating motions between the sprung member and the unsprung member. The vibrations are damped by the damping force.

The shock absorber of the present invention has a rotation body, such as the rotor of the motor, which rotates as a result of approaching and separating motions between the sprung member and the unsprung member. In addition to the induction current (generated current) contributing to generation of the damping force, a current (inertia corresponding current) which electrically represents the inertial force of the rotation body flows through the motor and the electric circuit. The phase of the inertia corresponding current is different from that of the induction current (generated current). Accordingly, the inertial force represented by the inertia corresponding current adversely affects the damping force, and, consequently, the sprung vibration transfer characteristic for vibrations at or near the unsprung resonance frequency deteriorates.

In this regards, the electrical characteristic adjustment part of the present invention adjusts the electrical characteristic of the electric circuit such that the inertia corresponding current decreases. Therefore, the inertia corresponding current is decreased or cancelled out. As a result of the inertia corresponding current being decreased or cancelled out, the influence of the inertial force on the damping force is mitigated or eliminated. Thus, the sprung vibration transfer characteristic at or near the unsprung resonance frequency is improved.

The inertia corresponding current is represented by a current flowing through an inertia corresponding capacitor which is imaginarily connected in parallel to the electric circuit and which has a capacitance corresponding to the inertia (inertial moment) of the rotation body. Accordingly, by means of decreasing the current flowing through the inertia corresponding capacitor by the electrical characteristic adjustment part, the sprung vibration transfer characteristic at or near the unsprung resonance frequency is improved.

Preferably, the electrical characteristic adjustment part comprises an inverting amplification circuit which includes an operational amplifier, an input resistor, and a feedback resistor, the operation amplifier having a non-inverting input terminal connected to one electricity supply terminal of the motor, an inverting input terminal connected to the other electricity supply terminal of the motor, and an output terminal; and an inertia compensation capacitor connected to the output terminal.

The inverting amplification circuit is an amplification circuit which outputs an output signal which is antiphase (has a phase shift of 180°) with respect to an input signal. In the case where the non-inverting input terminal of the inverting amplification circuit is connected to one electricity supply terminal of the motor and the inverting input terminal thereof is connected to the other electricity supply terminal of the motor, the inductive electromotive force (counter electromotive force) generated by the motor is applied between the input terminals of the inverting amplification circuit. Therefore, a voltage which is antiphase to the inductive electromotive force is applied to the output terminal side.

Also, an inertia compensation capacitor is connected to the output terminal of the inverting amplification circuit. Therefore, due to the voltage applied to the output terminal side (voltage which is antiphase to the inductive electromotive force), a current which is antiphase to the inertia corresponding current flows through the inertia compensation capacitor. That is, the current flowing through the inertia compensation capacitor is a current which is antiphase to the current flowing through the inertia corresponding capacitor which is imaginarily connected in parallel to the electric circuit. Since the current antiphase to the inertia corresponding current flows through the inertia compensation capacitor, the inertia corresponding current is reduced. As a result of a reduction in the inertia corresponding current, the influence of the inertial force on the damping force is mitigated. Thus, the sprung vibration transfer characteristic at or near the unsprung resonance frequency is improved.

Preferably, the amplification factor of the inverting amplification circuit and the capacitance of the inertia compensation capacitor are determined such that the inertia corresponding current can be reduced by the current flowing through the inertia compensation capacitor. Preferably, the amplification factor of the inverting amplification circuit and the capacitance of the inertia compensation capacitor are determined such that the current flowing through the inertia compensation capacitor becomes substantially equal to the inertia corresponding current.

More preferably, the amplification factor of the inverting amplification circuit is set to 1, and the inertia compensation capacitor has a capacitance corresponding to the inertia of the rotation body. Specifically, the capacitance of the inertia compensation capacitor is preferably set to a value ($J/K_m^2$) obtained by dividing the internal moment J of the rotation body by the square of the torque constant $K_m$ of the motor. Since the amplification factor and the capacitance are determined in this manner, a current which is equal in magnitude and is antiphase to the inertia corresponding current flows through the inertia compensation capacitor. Since a current which is equal in magnitude and is antiphase to the inertia corresponding current flows through the inertia compensation capacitor, the inertia corresponding current is cancelled out. As a result of the inertia corresponding current being cancelled out, the influence of the inertial force on the damping force is eliminated. Thus, the sprung vibration transfer characteristic at or near the unsprung resonance frequency is improved. Also, since the current which is antiphase to the inertia corresponding current is automatically produced by the inverting amplification circuit, computation processing performed by a microcomputer or the like is not required so as to remove the influence of the inertia. Therefore, by applying the present invention to an electric shock absorber which does not require control performed by a microcomputer, there can be provided a suspension apparatus which includes an inexpensive, high performance electric shock absorber.

The current flowing through the inertia compensation capacitor may be supplied to the electric circuit. Also, preferably, the inertia compensation capacitor is substantially connected between the output terminal and the non-inverting input terminal or the one electricity supply terminal of the motor. As shown in an embodiment to be described later, a connection path connected to the inertia compensation capacitor and a connection path which connects the non-inverting input terminal of the inverting amplification circuit and the electric circuit may have the same potential.

The feature of another suspension apparatus of the present invention resides in that the electrical characteristic adjustment part adjusts the electrical characteristic of the electric circuit such that an anti-resonance frequency of a parallel resonant circuit formed by the electric circuit and an inertia corresponding capacitor which is imaginarily connected in parallel to the electric circuit and which has a capacitance corresponding to the inertia of the rotation body coincides with a predetermined frequency equal to or close to an unsprung resonance frequency.

As described above, the inertial force of the rotation body is electrically represented by the inertia corresponding current flowing through the inertia corresponding capacitor which is connected in parallel to the electric circuit and which has a capacitance corresponding to the inertia of the rotation body. Therefore, a parallel resonant circuit can be formed by the electric circuit and the inertia corresponding capacitor which is imaginarily connected in parallel to the electric circuit. In the present invention, the electrical characteristic of the electric circuit is adjusted such that the anti-resonance frequency of the parallel resonant circuit coincides with a predetermined frequency equal to or close to the unsprung resonance frequency. In the case where the anti-resonance frequency is the unsprung resonance frequency, the impedance of the electric circuit for vibrations in the unsprung resonance frequency band increases. When the impedance of the electric circuit increases, the inertia corresponding current and the induction current (generated current) contributing to generation of the damping force which flow through the motor and the electric circuit decrease. Therefore, the damping force against the vibrations in the unsprung resonance frequency band is decreased. Since the damping force against vibrations in the unsprung resonance frequency band is decreased, vibrations input from the road surface are absorbed by bouncing motions of the unsprung member only. Therefore, transfer of the vibrations to the sprung member is suppressed. Thus, the sprung vibration transfer characteristic at or near the unsprung resonance frequency is improved.

Preferably, an external resistor whose resistance is variable is connected to the electric circuit; and the electrical characteristic adjustment part comprises a target damping force computation section which computes a target damping force which is a target value of the damping force generated by the shock absorber, a required resistance computation section which computes, on the basis of the target damping force, a required resistance which is an external resistance required by the electric circuit so as to cause the shock absorber to generate the target damping force, and a resistance correction section which corrects the resistance of the external resistor such that the resistance of the external resistor represents a combined impedance of the required resistance and a required inductance which is determined in advance as an external inductance required by the electric circuit so as to render the anti-resonance frequency coincident with the predetermined frequency equal to or close to the unsprung resonance frequency.

The damping force generated by the shock absorber depends on the resistance of the resistor connected to the electric circuit. In the present invention, a target damping force, which is a target value of the damping force, is obtained on the basis of the skyhook theory or the like, and an external resistance (required resistance) which the electric circuit requires so as to cause the shock absorber to generate the target damping force is obtained on the basis of the target damping force. Also, an external inductance (required inductance) which the electric circuit requires so as to render the anti-resonance frequency of the parallel resonant circuit— formed by the electric circuit and the inertia corresponding capacitor—coincident with the predetermined frequency equal to or close to the unsprung resonance frequency is obtained in advance.

Then, the resistance of the external resistor is corrected (variably controlled) such that the resistance of the external resistor connected to the electric circuit represents the combined impedance of the required resistance and the required inductance. Therefore, a coil (inductor) for obtaining the required inductance is not required to be connected to the electric circuit.

In the case where the resistance of the external resistor is corrected as described above, the shock absorber generates the target damping force against, for example, vibrations at or near the sprung resonance frequency, whereby the vibrations are damped quickly. Also, for vibrations at or near the unsprung resonance frequency, the damping force is decreased, because the impedance of the electric circuit increases due to anti-resonance. Since the damping force is decreased, vibrations input from the road surface are absorbed by bouncing motions of the unsprung member only. Therefore, transfer of the vibrations to the sprung member is suppressed. Thus, the sprung vibration transfer characteristic at or near the unsprung resonance frequency is improved.

In the present specification, the "external resistor whose resistance is variable" may be any such external resistor, so long as the external resistor is configured such that the current flowing therethrough can be changed. The expression "external resistor whose resistance is variable" encompasses not only a variable resistor whose resistance itself can be changed, but also a circuit which includes a fixed resistor and a switching element and is configured such that the current flowing through the fixed resistor is changed through open/close control (e.g., duty control) of the switching element.

The feature of another suspension apparatus of the present invention resides in that the electrical characteristic adjustment part comprises inertia corresponding current computation section which computes the inertia corresponding current on the basis of the inductive electromotive force and a capacitance corresponding to the inertia of the rotation body; and an inertia compensation current supply apparatus which supplies to the electric circuit an inertia compensation current which is a current antiphase to the computed inertia corresponding current.

An inertia compensation current which is a current antiphase with respect to the inertia corresponding current is supplied to the electric circuit by the inertia compensation current supply apparatus. Since the inertia compensation current flows through the electric circuit, the inertia corresponding current is reduced or cancelled out. As a result of the inertia corresponding current being reduced or cancelled out, the influence of the inertial force on the damping force is eliminated. Thus, the sprung vibration transfer characteristic at or near the unsprung resonance frequency is improved.

Another suspension apparatus of the present invention comprises a first element having a first impedance; a second element having a second impedance; and a connection state changeover device which selectively connects the first element or the second element to the electric circuit. The first impedance is set in advance such that a vibration of the sprung member is suppressed by a damping force generated when the first element is connected to the electric circuit. The second impedance is set in advance such that, when the second element is connected to the electric circuit, the impedance of the electric circuit becomes smaller than an impedance represented by a capacitance corresponding to the inertia of the rotation body. The electrical characteristic adjustment part controls operation of the connection state changeover device such that the first element is connected to the electric circuit in the case where the inertia corresponding current is smaller than a normal current which is the induction current flowing through the electric circuit when the first element is connected to the electric circuit, and the second element is connected to the electric circuit in the case where the inertia corresponding current is larger than the normal current.

In the case where the inertia corresponding current is smaller than a normal current, which is the induction current (generated current) which flows through the electric circuit when the first element is connected to the electric circuit, the influence of the inertial force of the rotation body on the damping force is small. Therefore, the necessity of eliminating the influence of the inertial force is low. In such a case, the first element having a first impedance is connected to the electric circuit. Thus, vibrations of the sprung member are suppressed effectively. In contrast, in the case where the inertia corresponding current is larger than the normal current, the influence of the inertial force of the rotation body on the damping force is large. Also, in the case where the inertia corresponding current is larger than the normal current, a vibration at or near the unsprung resonance frequency is highly likely to be input to the shock absorber. These facts show that, in the case where the inertia corresponding current is larger than the normal current, the sprung vibration transfer characteristic for vibrations in the unsprung resonance frequency band deteriorates. In such a case, according to the present invention, the second element having a second impedance is connected to the electric circuit. The second impedance is set in advance such that, when the second element is connected to the electric circuit, the impedance of the electric circuit becomes smaller than an impedance represented by a capacitance corresponding to the inertia of the rotation body; i.e., the impedance of the inertia corresponding capacitor. Thus, a large amount of induction current flows to the second element side, whereby the inertia corresponding current decreases relatively. Since the inertia corresponding current decreases relatively, the influence of the inertial force on the damping force is reduced. Consequently, the sprung vibration transfer characteristic for vibrations at or near the unsprung resonance frequency is improved.

The above-described impedance of the electric circuit refers to the overall impedance which includes not only the impedance of an element externally connected to the electric circuit, but also the internal impedance of the motor such as the inductance of the motor and the internal resistance of the motor.

The second impedance may be an impedance which is required by the electric circuit to operate such that, when the second element is connected to the electric circuit, an anti-resonance frequency of a parallel resonant circuit formed by the electric circuit and an inertia corresponding capacitor which is imaginarily connected in parallel to the electric circuit and which has a capacitance corresponding to the inertia of the rotation body coincides with a predetermined frequency equal to or close to an unsprung resonance frequency. By virtue of this configuration, when the second element is connected to the electric circuit, the anti-resonance frequency of the parallel resonant circuit formed by the electric circuit and the inertia corresponding capacitor coincides with a predetermined frequency equal to or close to the unsprung resonance frequency. In the case where the anti-resonance frequency is the unsprung resonance frequency, the impedance of the electric circuit for vibrations in the unsprung resonance frequency band increases. When the impedance of the electric circuit increases, the inertia corresponding current and the induction current (generated current) contributing to the damping force which flow through the motor and the electric circuit decrease. Therefore, the damping force against the vibrations in the unsprung resonance frequency band is decreased. Since the damping force against vibrations in the unsprung resonance frequency band is decreased as described above, vibrations input from the road surface are absorbed by bouncing motions of the unsprung member only. Therefore, transfer of the vibrations to the sprung member is suppressed. Accordingly, the sprung vibration transfer characteristic at or near the unsprung resonance frequency is improved.

Another suspension apparatus of the present invention comprises an external resistor connected to the electric circuit; a switch which can operate to open and close the electric circuit; and a duty control section for duty-controlling the switch. The electrical characteristic adjustment part is configured such that, when the inertia corresponding current is smaller than the induction current, the electrical characteristic adjustment part sets the duty ratio of the switch to 100%, and, when the inertia corresponding current is larger than the induction current, the electrical characteristic adjustment part sets the duty ratio of the switch to a predetermined duty ratio such that the damping force generated by the shock absorber becomes equal to or smaller than a predetermined damping force.

In the case where the inertia corresponding current is smaller than the induction current (generated current) contributing to generation of the damping force, a desired damping force can be generated by setting the duty ratio of the switch to 100%. In contrast, in the case where the inertia corresponding current is larger than the induction current, the duty ratio of the switch is set to a predetermined low duty ratio (e.g., 50%) such that the damping force generated by the shock absorber becomes equal to or smaller than a predetermined low damping force. In the case where the inertia corresponding current is larger than the induction current, a vibration at or near the unsprung resonance frequency is highly likely to be input to the shock absorber. That is, in the present invention, when a vibration at or near the unsprung resonance frequency is input to the shock absorber, the duty ratio of the switch is decreased. Thus, the current flowing through the motor and the electric circuit is reduced. As a result, the damping force is decreased. Since the damping force is decreased, only the unsprung member bounces for vibrations at or near the unsprung resonance frequency, whereby transfer of the vibrations to the sprung member is suppressed. Therefore, the sprung vibration transfer characteristic at or near the unsprung resonance frequency is improved.

MODE FOR CARRYING OUT THE INVENTION

Hereinafter, preferred embodiments of the present invention will now be described.

Figure 1:
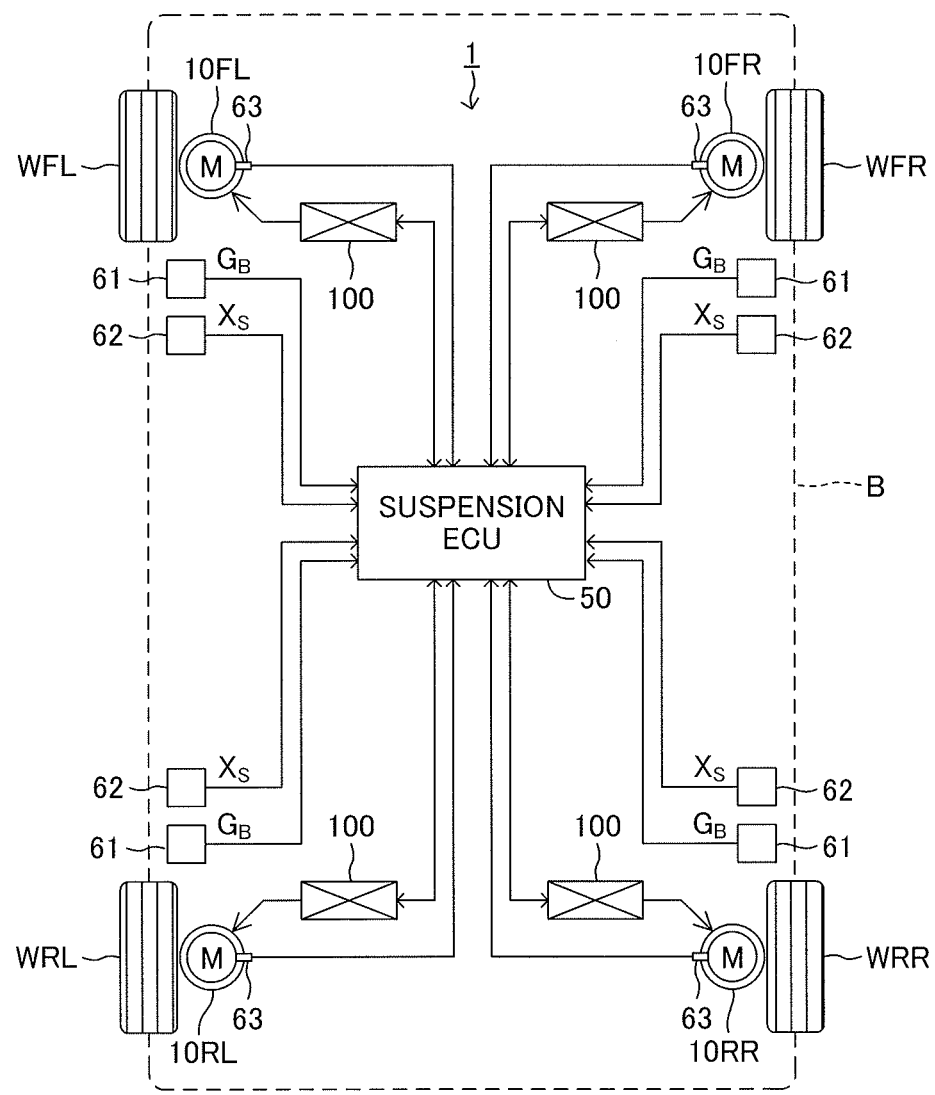
FIG. 1 is an overall schematic view of a suspension apparatus 1 for a vehicle which is common among embodiments of the present invention.

FIG. 1 is a schematic view of a vehicular suspension apparatus 1 which is common to all embodiments of the present invention. A suspension apparatus 1 includes four suspension main bodies 10FL, 10FR, 10RL, and 10RR, and a suspension ECU 50. The four suspension main bodies 10FL, 10FR, 10RL, and 10RR are provided between the body B of the vehicle and respective wheels WFL, WFR, WRL, and WRR. In the following description, the four suspension main bodies 10FL, 10FR, 10RL, and 10RR will be simply and collectively referred to as the suspension main body 10, and the wheels WFL, WFR, WRL, and WRR will be simply and collectively referred to as the wheel W except the case where the locations (front-left, front-right, rear-left, and rear-right) of the suspension main bodies or wheels must be distinguished from one another.

Figure 2:
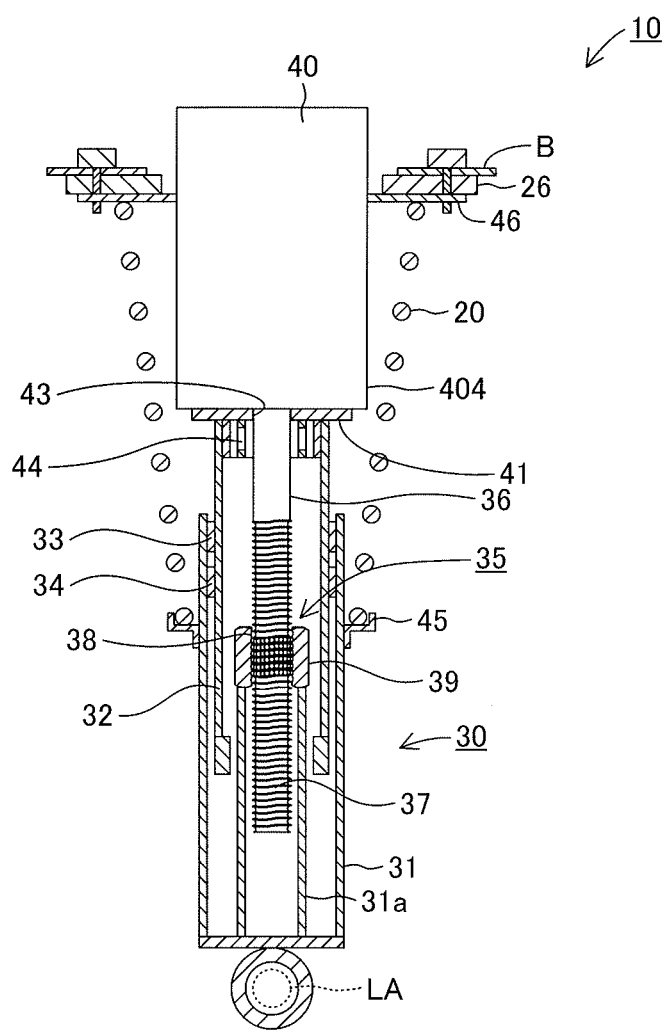
FIG. 2 is a schematic view showing an example of a suspension main body.

FIG. 2 is a schematic view showing an example of the suspension main body 10. The suspension main body 10 includes a coil spring 20 and an electric shock absorber 30 disposed in parallel with each other. The coil spring 20 is provided between a lower arm LA connected to the wheel W and the vehicle body B. A member on the upper side of the coil spring 20; i.e., on the side toward the vehicle body B, will be referred to as a "sprung member," and a member on the lower side of the coil spring 20; i.e., on the side toward the wheel W, will be referred to as an "unsprung member."

The electric shock absorber 30 includes an outer cylinder 31, an inner cylinder 32, a ball screw mechanism 35 (motion conversion mechanism), and a motor 40.

As shown in FIG. 2, the outer cylinder 31 assumes the form of a bottomed cylinder, and is connected to the lower arm LA (the unsprung member side) via a lower bottom wall portion thereof. The inner cylinder 32 is coaxially disposed inside the outer cylinder 31. The inner cylinder 32 is supported by bearings 33 and 34 attached to the inner circumference of the outer cylinder 31 such that the inner cylinder 32 is movable in the axial direction of the outer cylinder 31.

The ball screw mechanism 35 is provided inside the inner cylinder 32. The ball-screw mechanism 35 includes a ball screw shaft 36 and a ball screw nut 39. The ball screw shaft 36 is coaxially disposed inside the inner cylinder 32. The ball screw nut 39 has a female thread portion 38, which is in screw engagement with a male thread portion 37 formed on the ball screw shaft 36. The lower end of the ball screw nut 39 is fixed to a nut support tube 31a extending upward from the bottom wall of the outer cylinder 31. As can be understood from such connection structure, the ball screw mechanism 35 and the outer cylinder 31 are connected to the unsprung member side (the lower arm LA side). The rotational motion of the ball screw nut 39 is restricted by an unillustrated rotation prevention mechanism. Therefore, the ball screw nut 39 moves rectilinearly in the axial direction of the ball screw shaft 36 as a result of the approaching or separating motion between the sprung member and the unsprung member. This rectilinear motion is converted to the rotational motion of the ball screw shaft 36. In reverse, when the ball screw shaft 36 rotates, its rotational motion is converted to the rectilinear motion of the ball screw nut 39.

The upper end of the inner cylinder 32 is fixed to an attachment plate 41. The attachment plate 41 is fixed to the bottom of a motor casing 404 which accommodates the rotor and stator of the motor 40. The attachment plate 41 has a through hole 43 formed at the center thereof, and the ball screw shaft 36 extends through the through hole 43. The ball screw shaft 36 is connected to the rotor of the motor 40 inside the motor casing 404, and is rotatably supported by a bearing 44 disposed within the inner cylinder 32.

Figure 3:
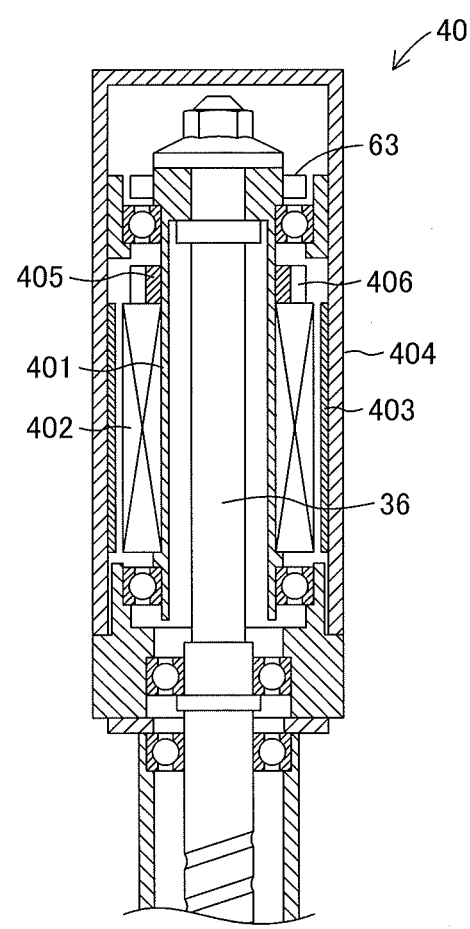
FIG. 3 is a schematic diagram showing an example of the internal structure of a motor.

FIG. 3 is a schematic view showing an example of the internal structure of the motor 40. The motor 40 has a hollow cylindrical motor shaft 401. A plurality of pole bodies (coil-wound cores) 402 are circumferentially arranged along and are fixed to the outer circumferential surface of the motor shaft 401. The motor shaft 401 and the pole bodies 402 constitute the rotor of the motor 40. Paired permanent magnets 403 having a north pole and a south pole, respectively, are fixed to the inner surface of the motor casing 404 such that the permanent magnets 403 face the plurality of pole bodies 402. The permanent magnets 403 and the motor casing 404 constitute the stator of the motor 40. The motor 40 is a brushed DC motor which includes a plurality of commutators 405 fixed to the motor shaft 401 and brushes 406 fixed to the motor casing 404 such that they are in sliding contact with the commutators 405.

An upper portion of the ball screw shaft 36 is inserted into the hollow space of the motor shaft 401. The upper end of the ball screw shaft 36 and the upper end of the motor shaft 401 are joined together such that the motor shaft 401 can rotate unitarily with the ball screw shaft 36. In addition, a rotational angle sensor 63 is provided inside the motor casing 404. The rotational angle sensor 63 detects the rotational angle of the motor shaft 401 (i.e., the rotational angle of the rotor).

As shown in FIG. 2, an attachment bracket 46 is connected to the motor casing 404. An upper support 26, which is formed from an elastic material and is connected to the vehicle body B, is attached to the upper surface of the attachment bracket 46. As can be understood from such connection structure, the stator (the motor casing 404 and the permanent magnets 403) of the motor 40 and the inner cylinder 32 are connected to the sprung member side via the upper support 26. The coil spring 20 is interposed between an annular retainer 45 provided on the outer circumferential surface of the outer cylinder 31, and the attachment bracket 46.

In the suspension main body 10 having the above-described structure, when the wheel W (unsprung member) and the vehicle body B (sprung member) approach or separate from each other, the outer cylinder 31 moves axially in relation to the inner cylinder 32. As a result of the relative axial movement of the outer cylinder 31, the coil spring 20 and the electric shock absorber 30 contract or extend. Through extension and contraction (compression) of the coil spring 20, a shock which the sprung member receives from the road surface is absorbed. Moreover, as a result of extension or contraction (compression) of the electric shock absorber 30, the ball screw nut 39 moves in the axial direction of the ball screw 36. The relative axial movement of the ball screw nut 39 causes the ball screw shaft 36 to rotate. The rotational motion of the ball screw shaft 36 is transmitted to the motor shaft 401, whereby the rotor (the motor shaft 401 and the pole bodies 402) of the motor 40 is rotated in relation to the stator (the permanent magnets 403 and the motor casing 404).

When the motor 40 (rotor) is rotated, the pole bodies 402 of the rotor cross the magnetic fluxes generated from the permanent magnets 403 of the stator, whereby an inductive electromotive force (counter electromotive force) is generated. As a result of generation of the inductive electromotive force, an induction current (generated current) flows through the pole bodies (coils) 402 of the motor 40. This generated current causes the motor 40 to generate a motor torque which acts in a direction opposite the rotation direction of the rotor; i.e., in a direction for stopping the rotation of the rotor. Such motor torque acts on the sprung member and the unsprung member as a damping force against vibrations between the sprung and unsprung member caused by approaching and separating motions between the sprung and unsprung member. The vibrations are damped by the damping force.

As shown in FIG. 1, the suspension ECU 50 is provided on the vehicle body B side. The suspension ECU 50 controls the damping force generated by each electric shock absorber 30 and performs control which is necessary for improving the sprung vibration transfer characteristic of the suspension apparatus. Notably, in the case where these controls are not required, the suspension ECU 50 need not be provided.

Sprung acceleration sensors 61, stroke sensors 62, and rotational angle sensors 63 are connected to the suspension ECU 50. Each sprung acceleration sensor 61 is attached to the sprung member to be located in the vicinity of a position where the corresponding suspension main body (10FL, 10FR, 10RL, or 10RR) is attached (i.e., in the vicinity of each wheel), and detects acceleration (sprung acceleration) $G_B$ which acts on the sprung member in the vertical direction at that position. The stroke sensor 62 is attached in the vicinity of each electric shock absorber 30, and detects the amount of extension and contraction (stroke displacement) $X_S$ of the electric shock absorber 30 in relation to the reference position.

In addition, the suspension apparatus 1 of the present embodiment has electric circuits 100, each of which is electrically connected to the motor 40 of the corresponding electric shock absorber 30.

a. First Embodiment

Figure 4:
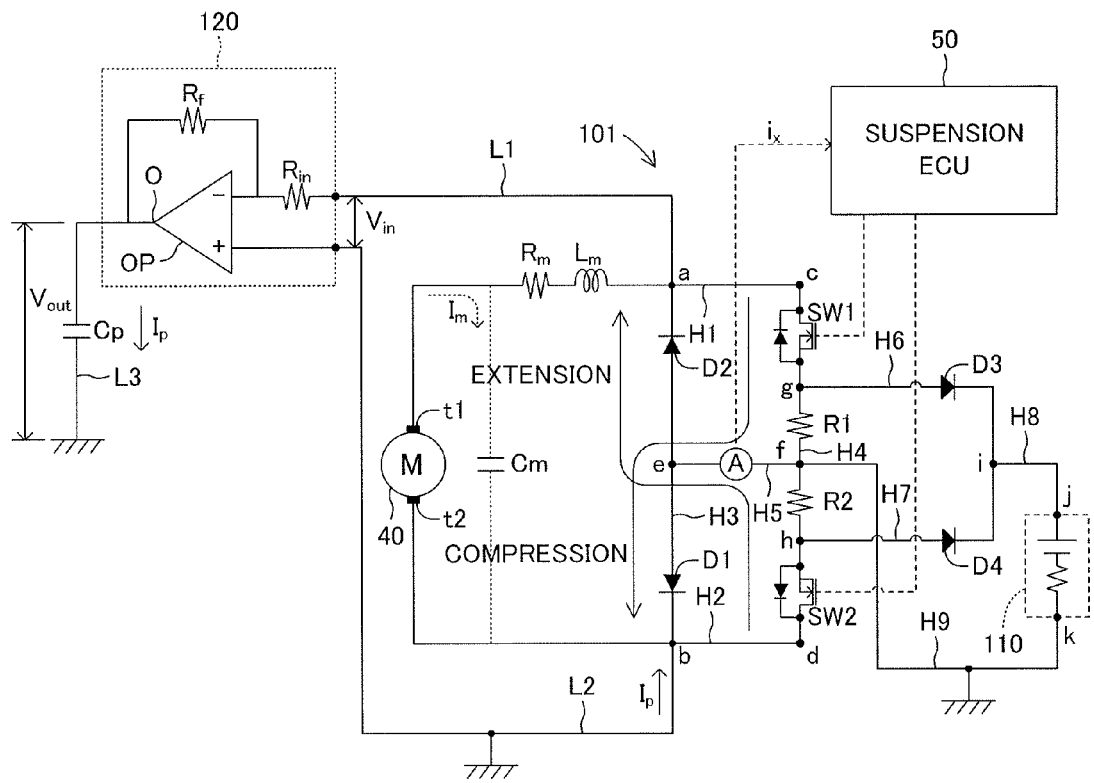
FIG. 4 is a circuit diagram of an electric circuit according to a first embodiment.

FIG. 4 is a circuit diagram showing an electric circuit 101 according to the first embodiment of the present invention. This electric circuit 101 electrically and externally connects together two electricity supply terminals (a first electricity supply terminal t1 and a second electricity supply terminal t2) of the motor 40. When the rotor of the motor 40 is rotated via the ball screw mechanism 35 due to a vibration between the sprung member and the unsprung member, an inductive electromotive force (counter electromotive force) is generated by the motor 40, whereby an induced current (generated current) flows through the electric circuit 101. In FIG. 4, $R_m$ represents an internal resistance of the motor 40, and $L_m$ represents a motor inductance. The internal resistance $R_m$ and the motor inductance $L_m$ are illustrated outside the motor 40 for the sake of convenience of description.

The electric circuit 101 includes a first connection path H1 electrically connected to the first electricity supply terminal t1 of the motor 40 and a second connection path H2 electrically connected to the second electricity supply terminal t2 of the motor 40. In addition, the electric circuit 101 includes a third connection path H3 which establishes a connection between a point "a" on the first connection path H1 and a point "b" on the second connection path H2; and a fourth connection path H4 which establishes a connection between a point "c" on the first connection path H1 and a point "d" on the second connection path H2. Furthermore, the electric circuit 101 includes a fifth connection path H5 which establishes a connection between a point "e" on the third connection path H3 and a point "f" on the fourth connection path H4.

A first diode D1 and a second diode D2 are provided in the third connection path H3. The first diode D1 is provided between the points "b" and "e", and the second diode D2 is provided between the points "a" and "e". The first diode D1 permits flow of current from the point "e" to the point "b", and prohibits flow of current from the point "b" to the point "e". The second diode D2 permits flow of current from the point "e" to the point "a", and prohibits flow of current from the point "a" to the point "e".

A first switching element SW1, a first resistor R1, a second resistor R2, and a second switching element SW2 are provided in the fourth connection path H4 in this order (i.e., from the point "c" side toward the point "d" side). The first resistor R1 is a fixed resistor having a resistance R1, and the second resistor R2 is a fixed resistor having a resistance R2. The first switching element SW1 and the second switching element SW2 serve to open and close the electric circuit 101. In the present embodiment, MOS-FETs are used as the first switching element SW1 and the second switching element SW2; however, other types of switching elements may be used.

The gates of the first switching element SW1 and the second switching element SW2 are connected to the suspension ECU 50. Thus, each of the first switching element SW1 and the second switching element SW2 is operated in accordance with the duty ratio set by a corresponding PWM (Pulse Width Modulation) control signal output from the suspension ECU 50. Notably, in the present description, "duty ratio" refers to an on-duty ratio; i.e., the ratio of the time during which a pulse signal is held at the ON level to the sum of the time during which the pulse signal is held at the ON level and the time during which the pulse signal is held at the OFF level. The first switching element SW1 is duty-controlled in order to control the magnitude of the current flowing from the point "c" to the point "f" on the fourth connection path H4. The second switching element SW2 is duty-controlled in order to control the magnitude of the current flowing from the point "d" to the point "f" on the fourth connection path H4.

A sixth connection path H6 is connected to a point "g" located between the first switching element SW1 and the first resistor R1 in the fourth connection path H4. A seventh connection path H7 is connected to a point "h" located between the second switching element SW2 and the second resistor R2 in the fourth connection path H4. The sixth connection path H6 and the seventh connection path H7 merge at a point "i". A third diode D3 is provided in the sixth connection path H6. The third diode D3 permits flow of current from the point "g" to the point "i", and prohibits flow of current from the point "i" to the point "g". A fourth diode D4 is provided in the seventh connection path H7. The fourth diode D4 permits flow of current from the point "h" to the point "i", and prohibits flow of current from the point "i" to the point "h".

Furthermore, an eighth connection path H8 is connected to the point "i". The positive electrode j of a power storage device 110 such as a car battery is connected to the eighth connection path H8. In addition, a ninth connection path H9 is connected to the point "f". The ninth connection path H9 is a grounding line. The negative electrode k of the power storage device 110 is connected to the ninth connection path. Notably, various electrical loads provided in the vehicle are connected to the power storage device 110.

How the generated current flows within the electric circuit 101 will now be described. In the case where the electric shock absorber 30 extends or contracts and the rotor of the motor 40 is rotated in relation to the stator as a result of an approaching or separating motion between the sprung member and the unsprung member, an inductive electromotive force (counter electromotive force) is generated. The direction of the inductive electromotive force changes depending on whether the electric shock absorber 30 is extended or compressed (contracted). For example, in the case where the sprung member and the unsprung member approach whereby the electric shock absorber 30 is compressed and the rotor of the motor 40 rotates in one direction, the first electricity supply terminal t1 of the motor 40 assumes a high potential, and the second electricity supply terminal t2 thereof assumes a low potential. In contrast, in the case where the sprung member and the unsprung member separate whereby the electric shock absorber 30 is extended and the rotor of the motor 40 rotates in the opposite direction, the second electricity supply terminal t2 of the motor 40 assumes a high potential, and the first electricity supply terminal t1 assumed a low potential.

Accordingly, when the electric shock absorber 30 is compressed, the generated current flows from the first electricity supply terminal t1 of the motor 40 to the second electricity supply terminal t2 thereof while passing through the points "c", "f", "e", and "b" in the electric circuit 101, in this sequence. That is, the generated current flows through a first electrical path "cfeb" which connects the points "c", "f", "e", and "b". In contrast, when the electric shock absorber 30 is extended, the generated current flows from the second electricity supply terminal t2 of the motor 40 to the first electricity supply terminal t1 thereof while passing through the points "d", "f", "e", and "a" in the electric circuit 101, in this sequence. That is, the generated current flows through a second electrical path "dfea" which connects the points "d", "f", "e", and "a". As described above, depending on whether the electrical shock absorber 30 is compressed or extended, the generated current flows through a different path within the electric circuit 101. As a result of flowing of the generated current through the motor 40 and the electric circuit 101, there is generated a motor torque which acts in the direction opposite the rotation direction of the rotor of the motor 40. This motor torque acts as a damping force against vibrations caused by the approaching and separating motions between the sprung member and the unsprung member.

The magnitude of the generated current flowing through the first electrical path "cfeb" is adjusted through duty control of the first switching element SW1. The magnitude of the generated current flowing through the second electrical path "dfea" is adjusted through duty control of the second switching element SW2. The magnitude of the generated current represents the magnitude of the damping force. By means of using the electric circuit 101, the damping force against the compression motion of the electric shock absorber 30 can be controlled separately from the damping force against the extension motion thereof.

An ammeter A is provided in the fifth connection path H5. This ammeter A measures an actual current $i_x$ flowing through the first electrical path "cfeb" or the second electrical path "dfea", and outputs the signal representing the measured actual current $i_x$ to the suspension ECU 50.

In the case where the inductive electromotive force generated by the motor 40 exceeds the output voltage (power storage voltage) of the power storage device 110, a part of electric power generated by the motor 40 is regenerated to the power storage device 110. For example, when the electric shock absorber 30 is compressed, the generated current splits into two currents at the point "g". One of these currents flows through the first electrical path "cfeb", and the other current flows through the sixth connection path H6 and the eighth connection path H8. The power storage device 110 is charged by the generated current flowing through the sixth connection path H6 and the eighth connection path H8. Also, when the electric shock absorber 30 is extended, the generated current splits into two currents at the point "h". One of these currents flows through the second electrical path "dfea", and the other current flows through the seventh connection path H7 and the eighth connection path H8. The power storage device 110 is charged by the generated current flowing through the seventh connection path H7 and the eighth connection path H8.

In the present embodiment, in the case where the electric shock absorber 30 extends or contracts as a result of an approaching or separating motion between the sprung member and the unsprung member, the rotor of the motor 40 and the ball screw shaft 36 of the ball screw mechanism 35 rotate. Hereinafter, the rotor and the ball screw shaft will be collectively referred to as a rotation body. In addition to the generated current contributing to the damping force, a current (inertia corresponding current) which electrically represents the inertial force of the rotation body flows through the motor 40 and the electric circuit 101. The phase of the inertia corresponding current is different from that of the generated current contributing to generation of the damping force. The mechanical inertial force of the rotation body is electrically represented by the current flowing through an inertia corresponding capacitor Cm which is imaginarily connected in parallel to the electric circuit 101 and which has a capacitance $C_m$ corresponding to the inertia (inertial moment) of the rotation body. Specifically, the capacitance $C_m$ of the inertia corresponding capacitor Cm is represented by a value $(J/K_m^2)$ which is obtained by dividing the inertial moment J of the rotation body by the square of the motor torque constant $K_m$ of the motor 40. Needless to say, this inertia corresponding capacitor Cm is not actually connected to the electric circuit 101.

In addition, as shown in FIG. 4, a connection path L1 is connected to the point "a" in the electric circuit 101, and a connection path L2 is connected to the point "b" therein. An inverting amplification circuit 120 including an operational amplifier (OP) is connected to the electric circuit 101 through the connection paths L1 and L2.

The inverting amplification circuit 120 includes the operational amplifier OP which has an inverting input terminal (−) connected to the first electricity supply terminal t1 of the motor 40 through the connection path L1, a non-inverting input terminal (+) connected to the second electricity supply terminal t2 of the motor 40 through the connection path L2, and an output terminal O; an input resistor $R_{in}$; and a feedback resistor $R_f$. The input resistor $R_{in}$ is connected to the inverting input terminal (−). The feedback resistor $R_f$ is provided between the output terminal O and the inverting input terminal (−). The output voltage $V_{out}$ of the inverting amplification circuit 120 is antiphase to the input voltage $V_{in}$ thereof. In the present embodiment, the resistance $R_{in}$ of the input resistor Rin is the same as the resistance $R_f$ of the feedback resistor Rf. Accordingly, the voltage amplification factor $(R_f/R_{in})$ is 1. Since the input voltage $V_{in}$ is the same as the inductive electromotive force V generated by the motor 40, a voltage which is equal in magnitude and is antiphase to the inductive electromotive force V is output from the output terminal O of the inverting amplification circuit 120.

An inertia compensation capacitor Cp is connected to the output terminal O. The capacitance of the inertia compensation capacitor Cp is the same as the capacitance $(J/K_m^2)$ of the inertia corresponding capacitor Cm. In addition, a connection path L3 is connected to the inertia compensation capacitor Cp. The connection path L3 and the connection path L2 are grounded (to the vehicle body). Accordingly, the connection path L3 and the connection path L2 assume the same potential, and are substantially connected together.

Figure 5:
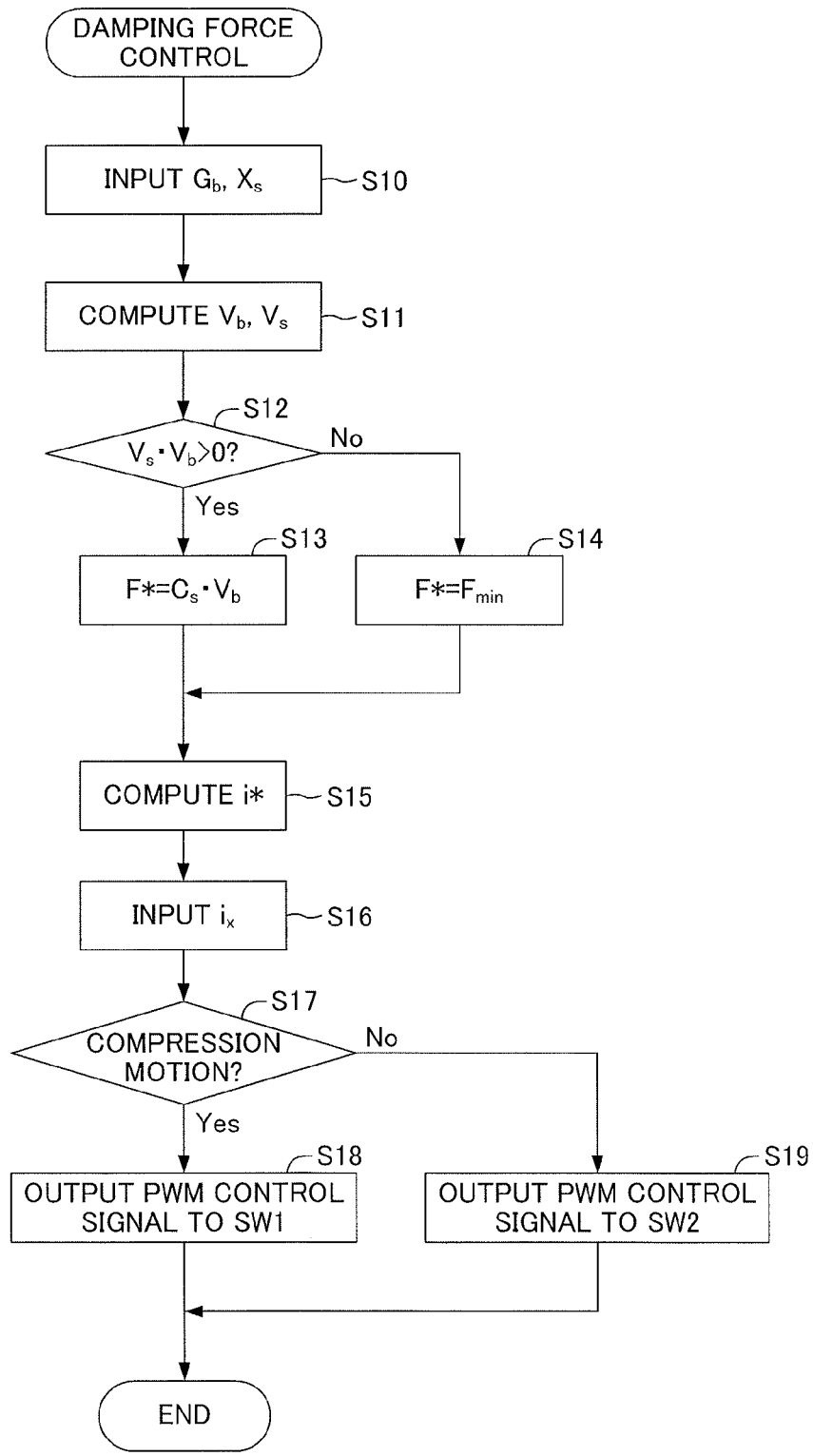
FIG. 5 is a flowchart showing an example of a damping force control routine executed by a suspension ECU in the first embodiment.

By use of the circuit configured as mentioned above, the suspension ECU 50 controls the damping force generated by the electric shock absorber 30 on the basis of a control theory relating to the riding quality; e.g., the skyhook theory. FIG. 5 is a flowchart showing an example of a damping force control routine executed by the suspension ECU 50. The damping force control routine of FIG. 5 is stored in the ROM of the suspension ECU 50 as a control program. By means of executing this damping force control routine, the suspension ECU 50 separately controls the damping forces generated by the respective electric shock absorbers 30.

Upon start of the damping force control routine, in Step (hereinafter, "Step" will be abbreviated to "S") 10, the suspension ECU 50 first receives a signal representing a sprung acceleration $G_b$ detected by each sprung acceleration sensor 61 and a signal representing a stroke displacement $X_s$ detected by each stroke sensor 62. In the subsequent step S11, the suspension ECU 50 computes a sprung speed $V_b$ by integrating the sprung acceleration $G_b$, and separately computes a stroke speed $V_s$ by differentiating the stroke displacement $X_s$. The sprung speed $V_b$ is the speed of vertical motion of the sprung member. The stroke speed $V_s$ is the speed of extension and contraction (compression) of the electric shock absorber 30. For an example, the sprung speed $V_b$ is computed such that it assumes a positive value when the sprung member moves up, and a negative value when the sprung member moves down. On the other hand, the stroke speed $V_s$ is computed such that it assumes a positive value when the electric shock absorber 30 extends, and a negative value when the electric shock absorber 30 contracts. Next, in S12, the suspension ECU 50 determines whether or not the product of the stroke speed $V_s$ and the sprung speed $V_b$ assumes a positive value.

In the case where it is determined in S12 that the product assumes a positive value (S12: Yes), the suspension ECU 50 proceeds to S13 so as to compute a target damping force F* in accordance with following expression (5).

$$F^* = C_s \cdot V_b \quad (5)$$

In the expression (5), $C_s$ is a predetermined damping coefficient (skyhook damping coefficient).

Meanwhile, in the case where it is determined in S12 that the product does not assume a positive value (S12: No), the suspension ECU 50 proceeds to S14 so as to compute the target damping force F* in accordance with the following expression (6).

$$F^* = F_{min} \quad (6)$$

In the above expression (6), $F_{min}$ is the minimum damping force (e.g., 0) of the electric shock absorber 30.

After computing the target damping force F* in S13 or S14, the suspension ECU 50 proceeds to S15 so as to compute a target value (target current) i* of the current that must flow through the electric circuit 101 in order to cause the electric shock absorber 30 to generate the target damping force F*. The target current i* can be obtained by dividing the result of conversion of the target damping force F* to a motor torque by the motor torque constant $K_m$.

Next, the suspension ECU 50 proceeds to S16 so as to receive the actual current $i_x$ detected by the ammeter A. In the subsequent step S17, the suspension ECU 50 determines whether the electric shock absorber 30 is extending or contracting on the basis of the polarity of the stroke speed $V_s$. If the electric shock absorber is contracting (S17: Yes), the suspension ECU 50 proceeds to S18 so as to output a PWM control signal to the first switching element SW1 such that the actual current $i_x$ becomes equal to the target current i*. In this case, for example, the suspension ECU 50 outputs the PWM control signal so as to reduce the deviation $\Delta i\ (=i^* - i_x)$ of the actual current $i_x$ from the target current i*. Thus, when the electric shock absorber 30 is contracting; i.e., when the sprung member and the unsprung member are approaching each other, the first switching element SW1 is duty-controlled such that the electric shock absorber 30 generates the target damping force F*. Meanwhile, when the shock absorber 30 is extending (S17: No), the suspension ECU 50 proceeds to S19 so as to output a PWM control signal to the second switching element SW2 such that the actual current $i_x$ becomes equal to the target current i*. Thus, when the electric shock absorber 30 is extending; i.e., when the sprung member and the unsprung member are separating from each other, the second switching element SW2 is duty-controlled such that the electric shock absorber 30 generates the target damping force F*. Notably, if the target damping force F* is $F_{min}$, the first switching element SW1 or the second switching element SW2 is duty-controlled such that the duty ratio becomes 0%.

Next, the suspension ECU 50 ends the current execution of this routine. Through repetitive performance of the above-described control, the suspension ECU 50 causes the electric shock absorber 30 to generate the target damping force F*.

When the electric shock absorber 30 extends or contracts as a result of an approaching or separating motion between the sprung member and the unsprung member, an inertial force is generated. As mentioned previously, the electric shock absorber 30 of the present embodiment includes a ball screw shaft 36 and the rotor of the motor 40, which rotate with the extension and contraction of the electric shock absorber 30 and which collectively serve as a rotation body. The generated current contributing to the damping force and the inertia corresponding current $I_m$ which electrically represents the inertial force of the rotation body flow through the motor 40 and the electric circuit 101. Since the phase of the inertia corresponding current $I_m$ is different from that of the generated current, the inertial force represented by the inertia corresponding current $I_m$ exerts an adverse effect on the damping force. Consequently, as mentioned previously, the sprung vibration transfer characteristic for vibrations at or near the unsprung resonance frequency deteriorates.

The inertia corresponding current $I_m$, is represented by the current flowing through the inertia corresponding capacitor Cm which is imaginarily connected in parallel to the electric circuit 101. In the present embodiment, the inertia corresponding current $I_m$ flowing through the inertia corresponding capacitor Cm is cancelled out by connecting the inverting amplification circuit 120 to the electric circuit 101, and by connecting the inertia compensation capacitor Cp to the output terminal O of the inverting amplification circuit 120.

The inertia corresponding current $I_m$ flowing through the inertia corresponding capacitor Cm is expressed by the following expression (7).

$$I_m = C_m \frac{dV}{dt} \quad (7)$$

In the expression (7), $C_m$ is the capacitance ($=J/K_m^2$) of the inertia corresponding capacitor Cm, and V is the inductive electromotive force.

The voltage $V_{in}$ applied to the input side of the inverting amplification circuit 120 is equal to the inductive electromotive force V. Meanwhile, the voltage $V_{out}$ output from the inverting amplification circuit 120 is a voltage −V which is antiphase to the inductive electromotive force. Accordingly, the current $I_p$ flowing through the inertia compensation capacitor Cp is expressed by the following expression (8).

$$I_p = -C_p \frac{dV}{dt} \quad (8)$$

In the expression (8), $C_p$ is the capacitance of the inertia compensation capacitor Cp.

The magnitude ($J/K_m^2$) of the capacitance $C_p$ of the inertia compensation capacitor Cp corresponds to the inertia of the rotation body. This capacitance $C_p$ is the same as the capacitance $C_m$ of the inertia corresponding capacitor Cm. Therefore, as can be understood from the expressions (7) and (8), the current $I_p$ flowing through the inertia compensation capacitor Cp is a current $-I_m$ which is antiphase to the inertia corresponding current $I_m$ flowing through the inertia corresponding capacitor Cm.

The connection path L3 to which the inertia compensation capacitor Cp is connected and the connection path L2 which is connected to the point "b" in the electric circuit 101 assume the same potential, and are substantially connected together. Accordingly, the current $I_p$ flowing through the inertia compensation capacitor Cp is led to the electric circuit 101 through the connection path L3 and the connection path L2. The current $I_p$ flowing through the electric circuit 101 cancels out the inertia corresponding current $I_m$ flowing through the inertia corresponding capacitor Cm. As a result of cancellation of the inertia corresponding current $I_m$, the influence of the inertial force upon the damping force is eliminated. Thus, the sprung vibration transfer characteristic for vibrations at or near the unsprung resonance frequency is improved.

(Modification)

Figure 6:
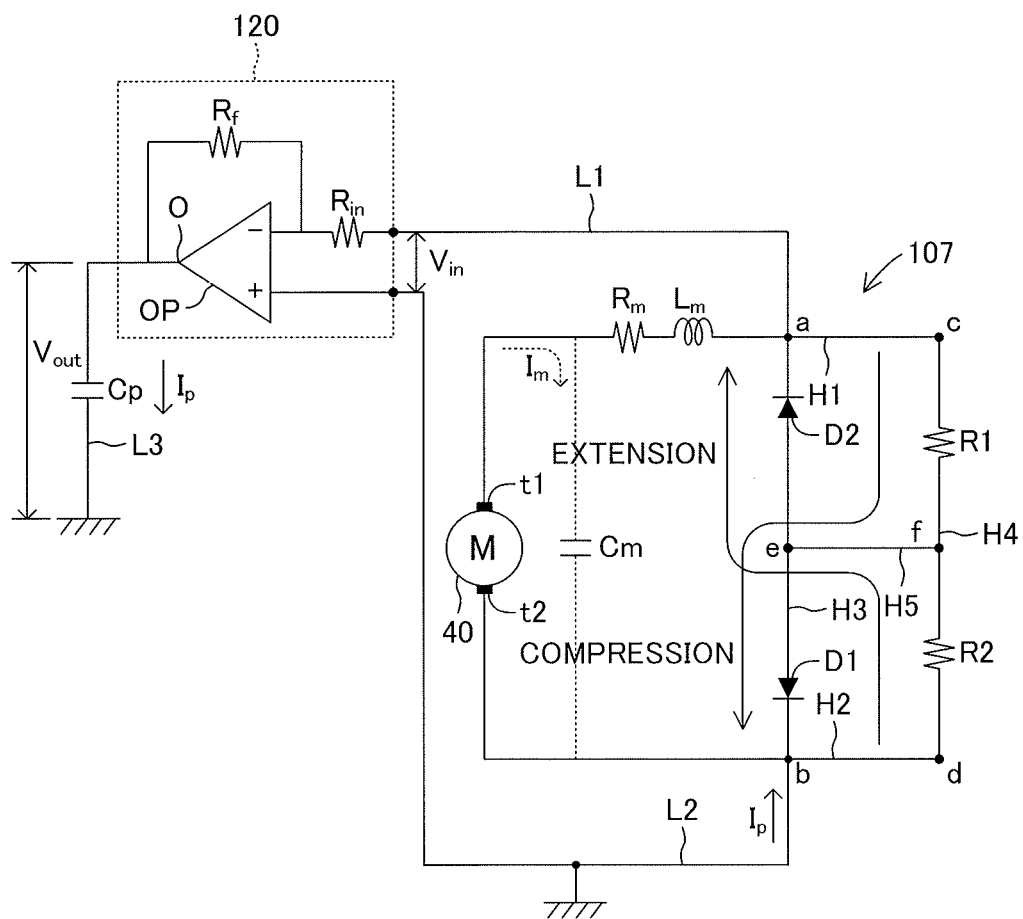
FIG. 6 is a circuit diagram of an electric circuit showing a modification of the first embodiment.

FIG. 6 is the circuit diagram of an electric circuit 107 according to a modification of the present embodiment. The configuration of the electric circuit 107 is the same as that of the electric circuit 101 shown in FIG. 4 except that the first and second switching elements SW1 and SW2, the ammeter A, and the circuit for charging the charging apparatus 110 are eliminated from the electric circuit 101. Accordingly, the description of the electric circuit 107 is omitted by incorporating herein by reference the description of the related portion of the electric circuit 101 of the above-described first embodiment. In addition, since the damping force of the electric shock absorber 30 is not controlled when this electric circuit 107 is used, the suspension ECU and sensors are not required.

The inverting amplification circuit 120 is connected to the electric circuit 107. The configuration of the inverting amplification circuit 120 and the configuration of connection between the electric circuit 107 and the inverting amplification circuit 120 are the same as the configuration of the inverting amplification circuit 120 and the configuration of connection between the electric circuit 101 and the inverting amplification circuit 120 of the above-described first embodiment. Accordingly, descriptions of these configurations are omitted by incorporating herein by reference the description of the configuration of the inverting amplification circuit 120 and the description of the configuration of connection between the electric circuit 101 and the inverting amplification circuit 120 of the above-described first embodiment.

The inertia compensation capacitor Cp is connected to the output terminal O of the inverting amplification circuit 120. The inertia compensation capacitor Cp has a capacitance $(J/K_m^2)$ which corresponds to the inertia (inertial moment) of the rotation body (the ball screw shaft 36 or the rotor of the motor 40) which rotates with the extension and contraction (compression) of the electric shock absorber 30.

The connection path L3 is connected to the inertia compensation capacitor Cp. The connection path L3 and the connection path L2 which establishes a connection between the point "b" in the electric circuit 107 and the non-inverting input terminal (+) of the inverting amplification circuit 120 assume the same potential, and are substantially connected together.

In such a configuration, for example, in the case where the sprung member and the unsprung member approach each other whereby the electric shock absorber 30 is compressed and the rotor of the motor 40 rotates in one direction, the first electricity supply terminal t1 of the motor 40 assumes a high potential, and the second electricity supply terminal t2 thereof assumes a low potential. In contrast, in the case where the sprung member and the unsprung member separate from each other whereby the electric shock absorber 30 is extended and the rotor of the motor 40 rotates in the opposite direction, the second electricity supply terminal t2 of the motor 40 assumes a high potential, and the first electricity supply terminal t1 thereof assumes a low potential.

Accordingly, when the electric shock absorber 30 is compressed, the generated current flows from the first electricity supply terminal t1 of the motor 40 to the second electricity supply terminal t2 thereof while passing through the points "c", "f", "e", and "b" in the electric circuit 107, in this sequence. That is, the generated current flows through the first electrical path "cfeb" which connects the points "c", "f", "e", and "b". In contrast, when the electric shock absorber 30 is extended, the generated current flows from the second electricity supply terminal t2 of the motor 40 to the first electricity supply terminal t1 thereof while passing through the points "d", "f", "e", and "a" in the electric circuit 107, in this sequence. That is, the generated current flows through the second electrical path "dfea" which connects the points "d", "f", "e", and "a". As described above, depending on whether the electrical shock absorber 30 is compressed or extended, the generated current flows through a different path within the electric circuit 107. As a result of the generated current flowing through the motor 40 and the electric circuit 107, there is generated a motor torque which acts in the direction opposite the rotation direction of the rotor of the motor 40. This motor torque acts as a damping force against vibrations between the sprung and unsprung members caused by the approaching and separating motions between the sprung and unsprung members.

When the generated current flows through the first electrical path "cfeb" as a result of compression of the electric shock absorber 30, there is generated a damping force which is determined on the basis of the resistance R1 of the first resistor R1. On the other hand, when the generated current flows through the second electrical path "dfea" as a result of extension of the electric shock absorber 30, there is generated a damping force which is determined on the basis of the resistance R2 of the second resistor R2.

When the electric shock absorber 30 extends or contracts (compresses) as a result of an approaching or separating motion between the sprung member and the unsprung member, an inertial force is generated. The electric shock absorber 30 according to this modification also includes a rotation body (the ball screw shaft 36 and the rotor of the motor 40) which rotates with the extension and contraction thereof. The generated current contributing to the damping force and the inertia corresponding current $I_m$ which electrically represents the inertial force of the rotation body flow through the motor 40 and the electric circuit 107. Since the phase of the inertia corresponding current $I_m$ is different from that of the generated current, the inertial force represented by the inertia corresponding current $I_m$ exerts an adverse effect on the damping force. Consequently, the sprung vibration transfer characteristic for vibrations within a frequency range at or near the unsprung resonance frequency deteriorates.

The inertia corresponding current $I_m$ is represented by a current flowing through the inertia corresponding capacitor Cm which is imaginarily connected in parallel to the electric circuit 107 and whose capacitance $(J/K_m^2)$ corresponds to the inertia of the rotation body. In this example, just like the above-described first embodiment, the current $I_p$ which is equal in magnitude and is antiphase to the inertia corresponding current $I_m$ flows through the inertia compensation capacitor Cp connected to the output terminal O of the inverting amplifier circuit 120. Since this current $I_p$ is supplied to the electric circuit 107, the inertia corresponding current $I_m$ is cancelled out. As a result of cancellation of the inertia corresponding current $I_m$, the sprung vibration transfer characteristic for vibrations within a frequency band at or near the unsprung resonance frequency is improved.

As described in the first embodiment and the modification, the inverting amplification circuit 120 having an amplification factor of 1 is connected to the electric circuit 101 (107), and the inertia compensation capacitor Cp whose capacitance corresponds to the inertia of the rotation body is connected to the output terminal O of the inverting amplification circuit 120. Thus, a current which is equal in magnitude and is antiphase to the inertia corresponding current $I_m$ is generated automatically. This current is supplied to the electric circuit 101 (107), thereby canceling out the inertia corresponding current $I_m$. Accordingly, the influence of inertia can be eliminated without performing special control through use of an ECU, etc.

In addition, by means of applying a technology for cancelling out the inertia corresponding current $I_m$, which has been described in the first embodiment and the modification, to a simple electric shock absorber whose damping force is not controlled through use of an ECU, etc., there can be provided a suspension apparatus having a high-performance electrical shock absorber which is inexpensive and can generate a damping force free of the influence of inertia.

b. Second Embodiment

In the above-described first embodiment, the inertia corresponding current $I_m$ flowing through the inertia corresponding capacitor Cm is canceled out by the antiphase current $I_p$ generated by the inverting amplification circuit 120, whereby the sprung vibration transfer characteristic for vibrations at or near the unsprung resonance frequency is improved. In a second embodiment which will be described below, the anti-resonance frequency of a parallel resonant circuit formed by an inertia corresponding capacitor Cm and an electric circuit is rendered coincident with a frequency which is equal to or close to the unsprung resonance frequency, whereby the sprung vibration transfer characteristic for vibrations at or near the unsprung resonance frequency is improved.

Figure 7:
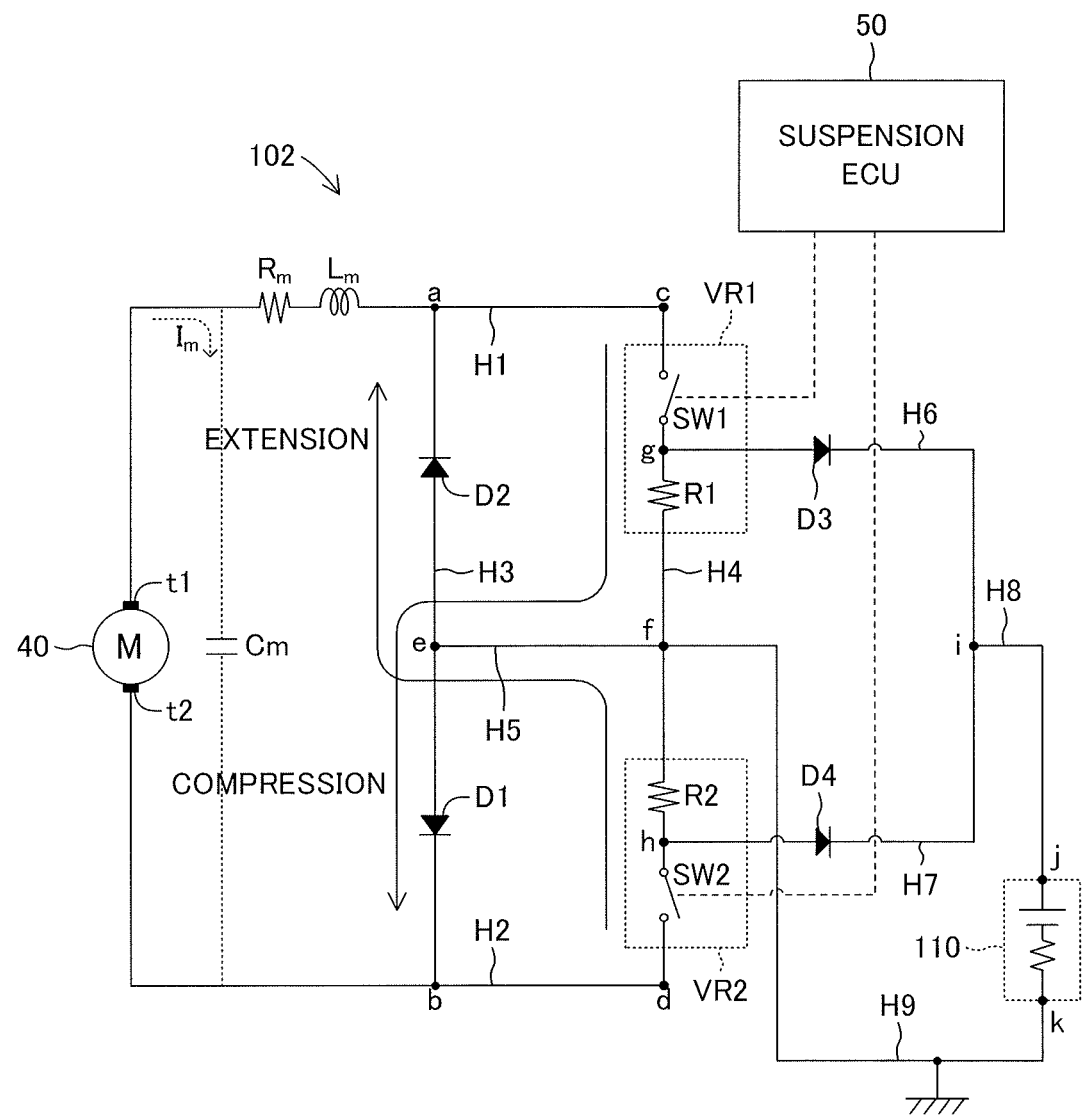
FIG. 7 is a circuit diagram of an electric circuit according to a second embodiment.

FIG. 7 is an electric circuit 102 according to the second embodiment. The electric circuit 102 is similar to the electric circuit 101 according to the first embodiment. However, the inverting amplification circuit 120, the inertia compensation capacitor Cp, etc. described in the first embodiment are not connected to the electric circuit 102. Among the components of the electric circuit 102, the components which are the same as those of the electric circuit 101 are identified by the same symbols as those used to identify the corresponding components of the electric circuit 101, and specific descriptions of those components are omitted accordingly.

A first variable resistor VR1 is provided between points "c" and 'T' on a connection path H4 of the electric circuit 102. The first variable resistor VR1 includes a first switching element SW1 and a first resistor R1 having a fixed resistance R1. In addition, a second variable resistor VR2 is provided between points "d" and "f" on the connection path H4. The second variable resistor VR2 includes a second switching element SW2 and a second resistor R2 having a fixed resistance R2.

The first variable resistor VR1 is configured such that the apparent resistance can be changed by adjusting the amount of the current flowing through the first resistor R1 through control of the switching operation of the first switching element SW1. The second variable resistor VR2 is configured such that the apparent resistance can be changed by adjusting the amount of the current flowing through the second resistor R2 through control of the switching operation of the second switching element SW2. That is, external resistors (variable resistors) capable of changing their resistances are connected to the electric circuit 102. The first switching element SW1 and the second switching element SW2 are controlled by the suspension ECU 50.

The generated current flows through the electric circuit 102 as a result of the inductive electromotive force generated by the motor 40. Since the flow of the generated current in the electric circuit 102 is the same as that of the generated current in the electric circuit 101 described in the first embodiment, the description thereof is omitted herein.

As a result of the generated current flowing through the motor 40 and the electric circuit 102, there is generated a motor torque which acts in the direction opposite the rotation direction of the rotor of the motor 40. Such motor torque acts as a damping force against vibrations between the sprung and unsprung members caused by approaching and separating motions between the sprung and unsprung members. The damping force is controlled through control of the first switching element SW1 and the second switching element SW2 by the suspension ECU 50.

The electrical shock absorber 30 according to the present embodiment also includes a rotation body (the ball screw shaft 36 and the rotor of the motor 40) which rotates with the extension and contraction (compression) thereof. The generated current contributing to generation of the damping force and the inertia corresponding current $I_m$ which represents the inertial force of the rotation body flow through the motor 40 and the electric circuit 102. The inertial force of the rotation body represented by the inertia corresponding current $I_m$ exerts an adverse effect on the damping force. Consequently, the sprung vibration transfer characteristic for vibrations at or near the unsprung resonance frequency deteriorates.

The inertia corresponding current $I_m$ is represented by a current flowing through the inertia corresponding capacitor Cm which is imaginarily connected in parallel to electric circuit 102. In the present embodiment, the anti-resonance frequency of the parallel resonant circuit composed of the electric circuit 102 and the inertia corresponding capacitor Cm is set to a frequency which is equal to or close to the unsprung resonance frequency. Thus, the sprung vibration transfer characteristic for vibrations at or near the sprung resonance frequency is improved.

Figure 8:
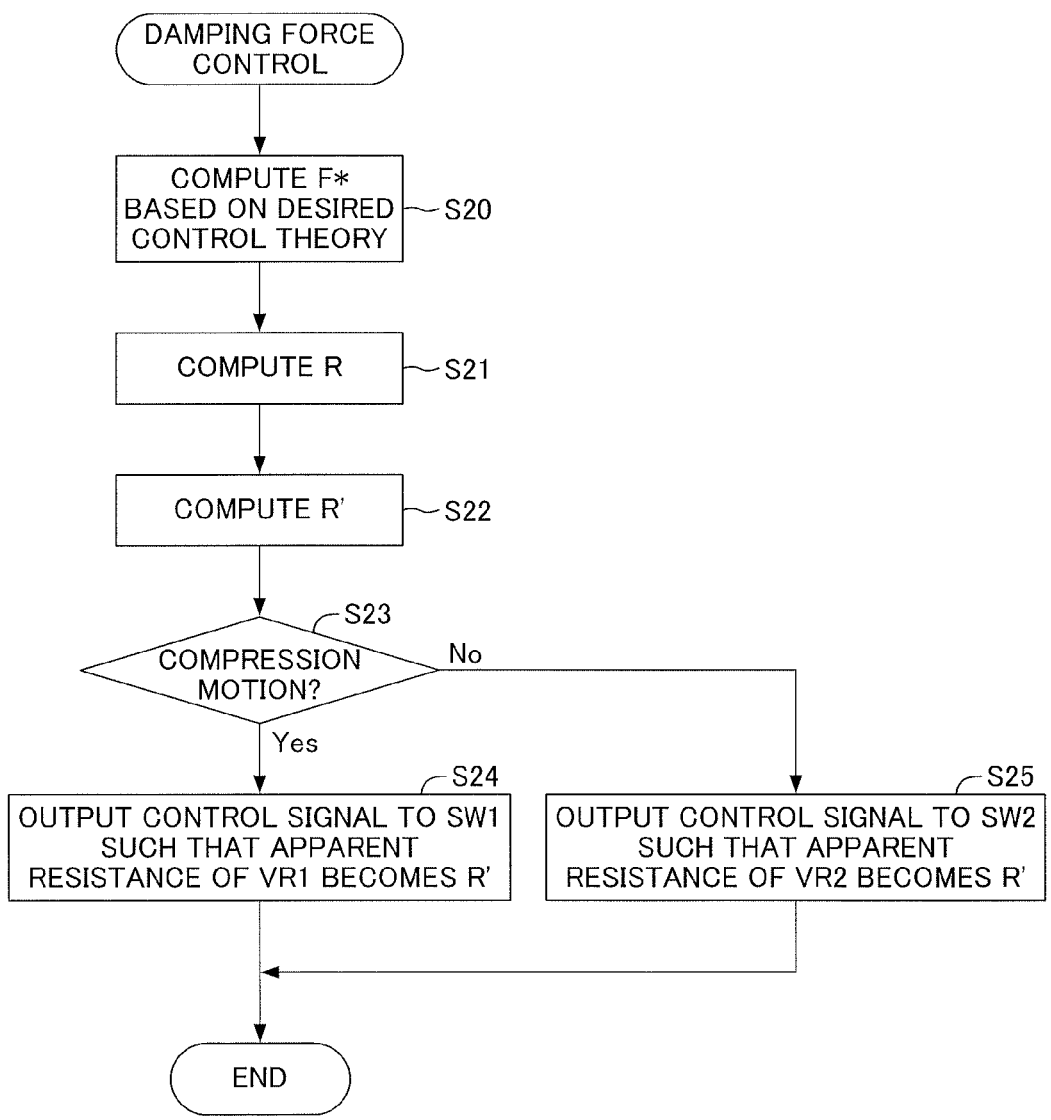
FIG. 8 is a flowchart showing an example of a damping force control routine executed by the suspension ECU in the second embodiment.

FIG. 8 is a flowchart showing an example of a damping force control routine executed by the suspension ECU 50. Upon start of this damping force control routine, in S20, the suspension ECU 50 first computes the target damping force F* on the basis of a desired control theory. In this case, the suspension ECU 50 may compute the target damping force F* on the basis of the skyhook theory described in the first embodiment. Alternatively, the suspension ECU may compute the target damping force F* on the basis of the non-linear $H_\infty$ theory.

Next, the suspension ECU 50 proceeds to S21 so as to compute a required resistance R; i.e., an external resistance required to cause the electrical shock absorber 30 to generate the target damping force F*. The method for computing the required resistance R is described below.

When the target damping force F* is generated by the electric shock absorber 30, the target damping force F* can be expressed by the following expression (9) through use of the impedance of the electric circuit 102.

$$F^*(s) = \left[\frac{2\pi}{N}\right]^2 \frac{K_m^2}{Ls + R_m + R} V_s(s) \qquad (9)$$

In the expression (9), F*(s) is the target damping force represented by the frequency domain, $V_s(s)$ is the stroke speed represented by the frequency domain, $K_m$ is the motor torque constant [V/(rad/s)], N is the lead [m/rotation] of the ball screw shaft 36, R is the external resistance [Ω] of the electric circuit 102, $R_m$ is the internal resistance [Ω] of the motor 40, L is the inductance [H] of the electric circuit 102, and s is the Laplace operator.

In addition, as shown in FIG. 7, an inertia corresponding capacitor Cm is imaginarily connected in parallel to the electric circuit 102. Accordingly, the electric circuit 102 and the inertia corresponding capacitor Cm can constitute a parallel resonant circuit. The anti-resonance frequency $f_h$ of the parallel resonant circuit is expressed by the following expression (10).

$$f_h = \frac{1}{2\pi\sqrt{L \cdot C_m}} \quad (10)$$

In the expression (10), L is the inductance of the electric circuit 102. In the present embodiment, the anti-resonance frequency is set to a frequency (target frequency) $f_w$ which is equal to or close to the unsprung resonance frequency. Preferably, for example, the target frequency $f_w$ is set to a frequency between 5 Hz and 15 Hz. When the inductance that the electric circuit 102 must have in order to render the anti-resonance frequency $f_h$ coincident with the target frequency $f_w$ is represented by $L_h$, the following expression (11) holds.

$$f_h = f_w = \frac{1}{2\pi\sqrt{(L_m + L_h) \cdot C_m}} \quad (11)$$

In the expression (11), $L_m$ is the motor inductance. The required inductance $L_h$ can be computed from the expression (11). This required inductance $L_h$ is computed in advance.

Substituting the sum $(L_h + L_m)$ of the required inductance $L_h$ computed from the expression (11) and the motor inductance $L_m$ for the inductance L of the expression (9) gives the following expression (12).

$$F^*(s) = \left[\frac{2\pi}{N}\right]^2 \frac{K_m^2}{(L_h + L_m)s + R_m + R} V_s(s) \quad (12)$$

Applying the final-value theorem to the expression (12) gives the expression (13).

$$\lim_{t\to\infty} F^*(t) = \lim_{s\to 0} sF^*(s) \quad (13)$$
$$= \lim_{s\to 0}\left[\frac{2\pi}{N}\right]^2 \frac{K_m^2 s}{(L_h + L_m)s + R_m + R} V_s(s)$$

When the stroke speed $V_s(t)$ represented by the time domain is expressed by a step response, $V_s(s)$ is 1/s. Accordingly, the expression (13) can be rewritten to the expression (14).

$$\lim_{t\to\infty} F^*(t) = \lim_{s\to 0} sF^*(s) \quad (14)$$
$$= \lim_{s\to 0}\left[\frac{2\pi}{N}\right]^2 \frac{K_m^2 s}{(L_h + L_m)s + R_m + R} \cdot \frac{1}{s}$$
$$= \left[\frac{2\pi}{N}\right]^2 \frac{K_m^2}{R_m + R}$$

The target damping force F* is substituted into the left side of the expression (14), whereby the required resistance R is computed on the basis of the target damping force F*.

Next, the suspension ECU 50 proceeds to S22 so as to compute a corrected resistance R'. The corrected resistance R' is set such that it represents the combined impedance obtained by combining the required resistance R and the required inductance $L_h$ or an impedance close thereto. The method for computing the corrected resistance R' is described below.

The relation between the target damping force F* and the impedance of the electric circuit 102 is expressed by the expression (12) given above. However, a coil (inductor) having a required inductance component $L_h$ is not actually connected to the electric circuit 102. In view of this, in the present embodiment, the electrical characteristic of the electric circuit 102 is adjusted as if the generated current flows through the electric circuit 102 to which a coil having the required inductance component $L_h$ is connected. That is, the electrical characteristic of the electric circuit 102 is adjusted such that anti-resonance occurs at the target frequency $f_w$. In this case, the suspension ECU 50 adjusts the electrical characteristic of the electric circuit 102 by correcting the apparent resistance of the first variable resistor VR1 or the second variable resistor VR2. When the corrected resistance is represented by R', the target damping force F* is expressed by the following expression (15).

$$F^*(s) = \left[\frac{2\pi}{N}\right]^2 \frac{K_m^2}{L_m s + R_m + R'} V_s(s) \quad (15)$$

The following expression (16) is derived from the expressions (12) and (15).

$$R' = L_h s + R \quad (16)$$

As can be understood from the expression (16), the corrected resistance R' represents the combined impedance (the required resistance R plus the required inductance $L_h$). In S22, the suspension ECU 50 computes the corrected resistance R' such that the expression (16) holds. That is, the suspension ECU 50 corrects (variably controls) the resistances of the first variable resistor VR1 and the second variable resistor VR2 such that the combined impedance (the required resistance R plus the required inductance $L_h$) is represented by the resistance of the first variable resistor VR1 or the second variable resistor VR2.

In this case, for example, the suspension ECU 50 computes the corrected resistance R' as described below.

The expression (12) can be rewritten to the following expression (17).

$$F^*(s) = G(s)V_s(s) \quad (17)$$

The transfer function G(s) included in the expression (17) can be expressed by the following expression (18).

$$G(s) = \left[\frac{2\pi}{N}\right]^2 \frac{K_m^2}{(L_m + L_h)s + R_m + R} \quad (18)$$

In addition, the expression (15) can be rewritten to the following expression (19).

$$F^*(s) = G_1(s)V_s(s) \quad (19)$$

The transfer function $G_1(s)$ included in the expression (19) can be expressed by the following expression (20).

$$G_1(s) = \left[\frac{2\pi}{N}\right]^2 \frac{K_m^2}{L_m s + R_m + R'} \quad (20)$$

The suspension ECU 50 memorizes the vector locus of the transfer function G(s) and the vector loci of a plurality of transfer functions $G_1(S)$ which are obtained by changing the corrected resistance R'. The suspension ECU 50 computes an angular frequency ω from the frequency of the vibration of the electrical shock absorber 30 currently received, and computes the distances between a position on the complex plane corresponding to the value of the transfer function G(s) at the angular frequency ω and positions on the complex plane corresponding to the values of the transfer functions $G_1(s)$ at the angular frequency. Subsequently, the suspension ECU 50 extracts a transfer function $G_1(s)$ used when the shortest distance was computed. The suspension ECU 50 stores, as the corrected resistance R', the resistance used in the extracted transfer function $G_1(s)$. Thus, the corrected resistance R' is computed.

Next, the suspension ECU 50 proceeds to S23 so as to determine whether or not the electric shock absorber 30 is contracting on the basis of the polarity of the stroke speed $V_s$. If the electric shock absorber 30 is contracting (S23: Yes), the suspension ECU 50 proceeds to S24 so as to output a control instruction to the first switching element SW1 such that the apparent resistance of the first variable resistor VR1 becomes equal to the corrected resistance R'. For example, if the corrected resistance R' is half the resistance R1 of the first resistor R1, the suspension ECU 50 outputs a control instruction to the first switching element SW1 such that the first switching element SW1 opens/closes at a duty ratio of 50%. Meanwhile, if the shock absorber 30 is extending (S23: No), the suspension ECU 50 proceeds to S25 so as to output a control instruction to the second switching element SW2 such that the apparent resistance of the second variable resistor VR2 becomes equal to the corrected resistance R'. In S22, S24, and S25, the resistances of the first variable resistor VR1 and the second variable resistor VR2 are controlled such that the combined impedance (the required resistance R plus the required inductance $L_h$) is represented by the apparent resistance of the first variable resistor VR1 or the second variable resistor VR2. After outputting the control instruction in S24 or S25, the suspension ECU 50 ends the current execution of this routine.

Through repetitive execution of the above-described damping force control routine, the apparent resistances of the first variable resistor VR1 and the second variable resistor VR2 are controlled such that the apparent resistance of either of these resistors represents the combined impedance (the required resistance R plus the required inductance $L_h$). Hence, the anti-resonance frequency of a parallel resonant circuit composed of the electric circuit 102 and the inertia corresponding capacitor Cm is set to the unsprung resonance frequency or a frequency near it.

Accordingly, in the case where the frequency of a vibration caused between the sprung member and the unsprung member is equal to or close to the sprung resonance frequency, anti-resonance does not occur between the electric circuit 102 and the inertia corresponding capacitor Cm, thereby allowing the electric shock absorber 30 to generate the target damping force. Consequently, the above-described vibration is damped immediately.

Meanwhile, in the case where the frequency of the vibration caused between the sprung member and the unsprung member is equal to or close to the unsprung resonance frequency, anti-resonance occurs between the electric circuit 102 and the inertia corresponding capacitor Cm. As a result of occurrence of the anti-resonance, the circuit impedance increases, and it becomes difficult for current to flow through the motor 40 and the electric circuit 102. Thus, the inertia corresponding current $I_m$ and the generated current contributing to generation of the damping force decrease. With the decrease in the currents flowing through the motor 40 and the electric circuit 102, the damping force generated by the electric shock absorber 30 also decreases. That is, the damping force against vibrations in the unsprung resonance frequency band decreases. With the decrease in the damping force against vibrations in the unsprung resonance frequency band, the vibrations in the unsprung resonance frequency band are absorbed by bouncing motions of the unsprung member only. As a result of absorption of the vibrations by bouncing motions of the unsprung member, transfer of the vibrations to the sprung member is suppressed. Thus, the sprung vibration transfer characteristic (the transmissibility of vibration to the sprung member) for vibrations at or near the unsprung resonance frequency is improved.

c. Third Embodiment

Figure 9:
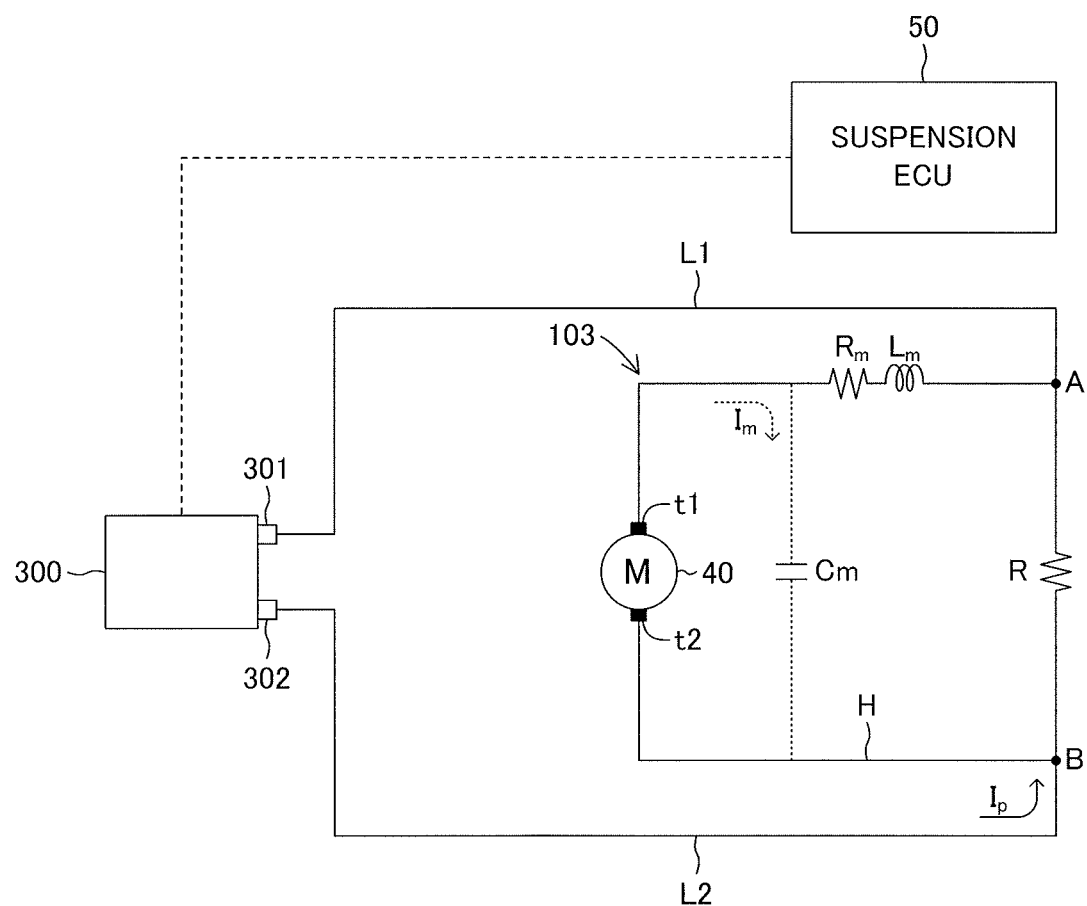
FIG. 9 is a circuit diagram of an electric circuit according to a third embodiment.

FIG. 9 is a circuit diagram showing an electric circuit 103 according to a third embodiment of the present invention. As shown in FIG. 9, the electric circuit 103 includes a main connection path H which connects the first electricity supply terminal t1 and second electricity supply terminal t2 of the motor 40. An external resistor R having a specified resistance is provided in the main connection path H. Notably, in FIG. 9, $L_m$ represents the motor inductance and $R_m$ represents the internal resistance of the motor 40. In addition, an inertia corresponding capacitor Cm is imaginarily connected in parallel to this electric circuit 103.

An inertia compensation current supply apparatus 300 is connected to the electric circuit 103. The inertia compensation current supply apparatus 300 supplies to the electric circuit 103 a current which is antiphase to the inertia corresponding current $I_m$ flowing through the electric circuit 103. The inertia compensation current supply apparatus 300 includes a first terminal 301 and a second terminal 302. The first terminal 301 is electrically connected to a point "A" on the main connection path H through the first connection path L1. The second terminal 302 is electrically connected to a point "B" on the main connection path H through the second connection path L2. The point "A" is located between the first electricity supply terminal t1 of the motor 40 and the external resistor R, and the point "B" is located between the second electricity supply terminal t2 of the motor 40 and the external resistor R.

Figure 10:
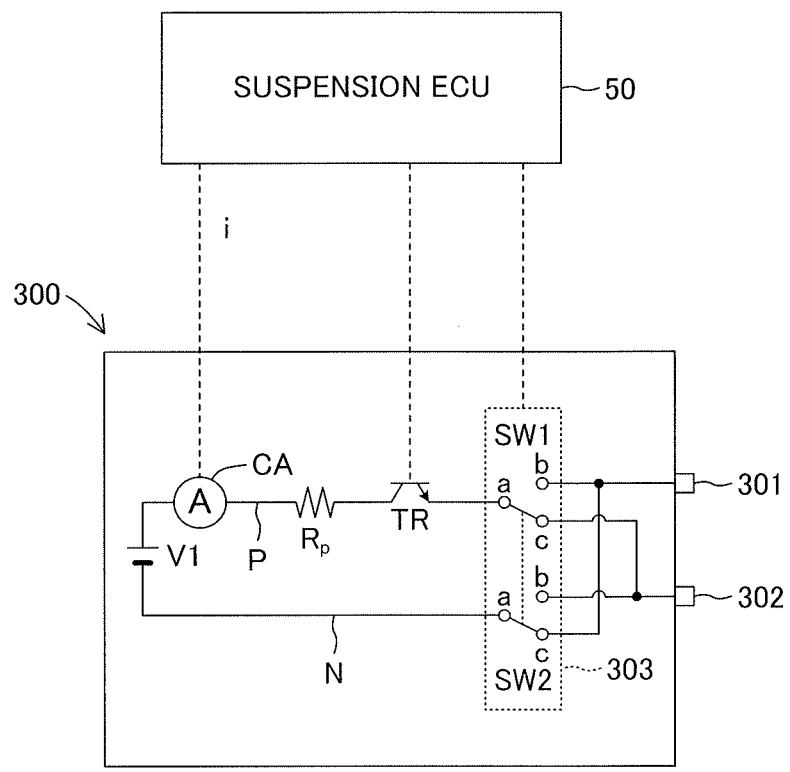
FIG. 10 is a diagram showing an example of an inertia compensation current supply apparatus.

FIG. 10 is a diagram showing an example of the inertia compensation current supply apparatus 300. The inertia compensation current supply apparatus 300 includes a DC power supply V1; a positive-electrode-side connection path P connected to the positive electrode of the DC power supply V1; a negative-electrode-side connection path N connected to the negative electrode of the DC power supply V1; a transistor switch TR, a fixed resistor $R_p$, and an ammeter CA which are provided in the positive-electrode-side connection path P, and a path changeover apparatus 303.

The path changeover apparatus 303 includes a first switch SW1 and a second switch SW2. Each switch includes one input terminal (terminal a), two output terminals (terminal b and terminal c), and a movable contact. The movable contact is moved to select the output terminal to be connected to the input terminal.

The positive-electrode-side connection path P is connected to the terminal a of the first switch SW1, and the negative-electrode-side connection path N is connected to the terminal a of the second switch SW2 respectively. In addition, the terminal b of the first switch SW1 and the terminal c of the second switch SW2 are connected to the first terminal 301 of the inertia compensation current supply apparatus 300. The terminal c of the first switch SW1 and the terminal b of the second switch SW2 are connected to the second terminal 302 of the inertia compensation current supply apparatus 300.

The transistor switch TR and the path changeover apparatus 303 are controlled by the suspension ECU 50. Specifically, the suspension ECU 50 controls the transistor switch TR so as to change the magnitude of the current supplied from the inertia compensation current supply apparatus 300 to the electric circuit 103. In addition, the suspension ECU 50 controls the changeover state of the path changeover apparatus 303 so as to change the direction of the flow of the current supplied from the inertia compensation current supply apparatus 300 to the electric circuit 103. By changing the magnitude and direction of the flow of the current, the suspension ECU 50 can supply a current, which is antiphase to the inertia corresponding current $I_m$, to the electric circuit 103.

When an inductive electromotive force is generated by the motor 40, the generated current flows through the electric circuit 103. Hereinafter, there will be described how the generated current flows through the electric circuit 103. In the case where the electric shock absorber 30 extends or contracts and the rotor of the motor 40 is rotated in relation to the stator as a result of an approaching or separating motion between the sprung member and the unsprung member, an inductive electromotive force (counter electromotive force) is generated. The direction of the inductive electromotive force changes depending on whether the electric shock absorber 30 is extended or compressed. For example, in the case where the sprung member and the unsprung member approach whereby the electric shock absorber 30 is compressed, the first electricity supply terminal t1 of the motor 40 assumes a high potential, and the second electricity supply terminal t2 thereof assumes a low potential. In contrast, in the case where the sprung member and the unsprung member separate whereby the electric shock absorber 30 is extended, the second electricity supply terminal t2 of the motor 40 assumes a high potential, and the first electricity supply terminal t1 assumes a low potential.

Accordingly, in the case where the electric shock absorber 30 is compressed, the generated current flows from the first electricity supply terminal t1 of the motor 40 to the second electricity supply terminal t2 thereof while passing through the main connection path H. In contrast, in the case where the electric shock absorber 30 is extended, the generated current flows from the second electricity supply terminal t2 of the motor 40 to the first electricity supply terminal t1 thereof while passing through the main connection path H. That is, depending on whether the electric shock absorber 30 is compressed or extended, the direction in which the generated current flows through the electric circuit 103 changes.

As a result of the generated current flowing through the motor 40 and the electric circuit 103, there is generated a motor torque which acts in the direction opposite the rotation direction of the rotor of the motor 40. This motor torque acts as a damping force against vibrations caused during the approaching and separating motions between the sprung member and the unsprung member.

The electrical shock absorber 30 of the present embodiment also includes a rotation body (the ball screw shaft 36 and the rotor of the motor 40) which rotates with the extension and contraction thereof. The generated current contributing to the damping force and the inertia corresponding current $I_m$ which represents the inertial force of the rotation body flow through the motor 40 and the electric circuit 103. The inertial force represented by the inertia corresponding current $I_m$ exerts an adverse effect on the damping force. Consequently, the sprung vibration transfer characteristic for vibrations at or near the unsprung resonance frequency deteriorates.

The inertia corresponding current $I_m$ is represented by a current flowing through the inertia corresponding capacitor Cm which is imaginarily connected in parallel to the electric circuit 103. In the present embodiment, the inertia corresponding current $I_m$ is computed and an inertia compensation current $I_p$ which is antiphase to the inertia corresponding current $I_m$ is supplied from the inertia compensation current supply apparatus 300 to the electric circuit 103, thereby cancelling out the inertia corresponding current $I_m$.

Figure 11:
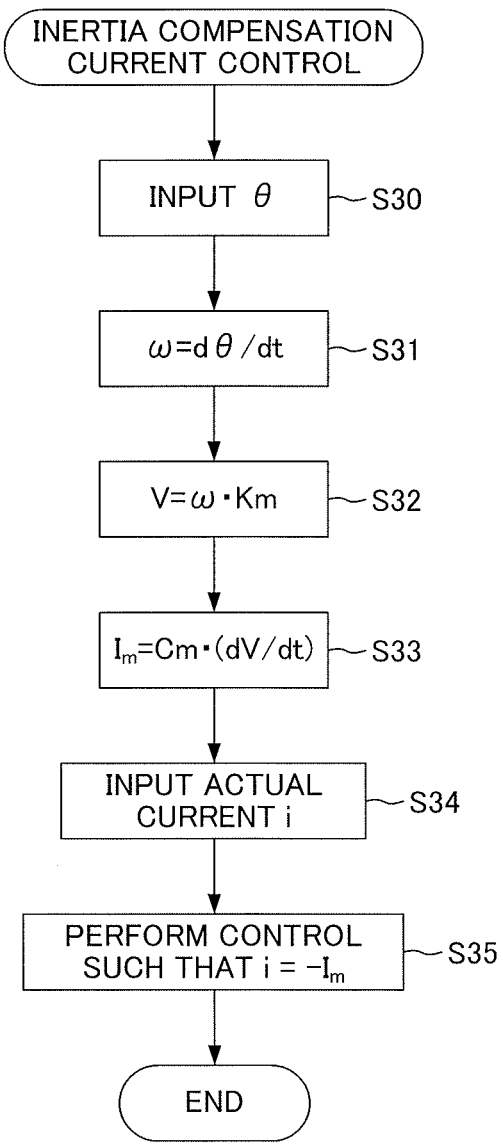
FIG. 11 is a flowchart showing an example of an inertia compensation current control routine executed by the suspension ECU in the third embodiment.

FIG. 11 is a flowchart showing an example of the inertia compensation current control routine executed by the suspension ECU 50 in order to supply the inertia compensation current $I_p$ from the inertia compensation current supply apparatus 300 to the electric circuit 103.

Upon start of the inertia compensation current control routine, the suspension ECU 50 first receives a rotational angle θ of the motor 40 (rotor) from the rotational angle sensor 63 in S30 of FIG. 11. Next, the suspension ECU 50 differentiates the received motor rotational angle θ with respect to time in order to compute the motor rotational angular speed ω (S31). Next, the suspension ECU 50 multiplies the motor rotational angular speed ω by a motor torque constant $K_m$ so as to compute an inductive electromotive force (counter electromotive force) V (S32). Next, the suspension ECU 50 differentiates the inductive electromotive force V with respect to time, and multiplies the differential value by the capacitance $C_m$ of the inertia corresponding capacitor Cm in order to compute the inertia corresponding current $I_m$ flowing through the inertia corresponding capacitor Cm (S33).

Subsequently, the suspension ECU 50 receives the actual current i detected by the ammeter CA (S34). Next, the suspension ECU 50 controls the transistor switch TR and the path changeover apparatus 303 such that the actual current i coincides with a current $-I_m$ which is antiphase to the inertia corresponding current $I_m$ (S35).

In this case, for example, the suspension ECU 50 determines the duty ratio of the transistor switch TR such that the magnitude of the actual current i detected by the ammeter CA becomes equal to that of the inertia corresponding current $I_m$, and controls the transistor switch TR on the basis of the determined duty ratio. In addition, for example, in the case where the computed inertia corresponding current $I_m$ flows in the direction indicated by the arrow in FIG. 9, the suspension ECU 50 outputs a control instruction to the path changeover apparatus 303 such that the terminals a and c of the first switch SW1 of the path changeover apparatus 303 are connected to each other and that the terminals a and c of the second switch SW2 thereof are also connected to each other. Thus, the inertia compensation current $I_p$ which is equal in magnitude to the inertia corresponding current $I_m$ is supplied from the second terminal 302 of the inertia compensation current supply apparatus 300 to the point B of the electric circuit 103 through the connection path L2. The direction of the flow of the supplied current is opposite to that of the inertia corresponding current $I_m$. In addition, in the case where the computed inertia corresponding current $I_m$ flows in the direction opposite to the direction indicated by the arrow in FIG. 9, the suspension ECU 50 outputs a control instruction to the path changeover apparatus 303 such that the terminals a and b of the first switch SW1 of the path changeover apparatus 303 are connected to each other and that the terminals a and b of the second switch SW2 thereof are also connected to each other. Thus, the inertia compensation current $I_p$ which is equal in magnitude to the inertia corresponding current $I_m$ is supplied from first terminal 301 of the inertial compensation current supply apparatus 300 to the point A of the electric circuit 103 through the connection path L1. The direction of the flow of the supplied current is opposite the direction of the flow of the inertia corresponding current $I_m$. That is, the inertia compensation current supply apparatus 300 supplies a current, which is always equal in magnitude and is antiphase to the inertia corresponding current $I_m$, to the electric circuit 103.

After controlling the transistor switch TR and the path changeover apparatus 303 in S35, the suspension ECU 50 ends the current execution of this routine.

Through repetitive execution of the inertia compensation current control routine by the suspension ECU 50, the inertia compensation current $I_p$ which is antiphase to the inertia corresponding current $I_m$ is constantly supplied to the electric circuit 103. The supplied inertia compensation current $I_p$ cancels out the inertia corresponding current $I_m$ flowing through the motor 40 and the electric circuit 103. As a result of cancellation of the inertia corresponding current $I_m$, the influence of the inertial force of the rotation body on the damping force is eliminated. Thus, the sprung vibration transfer characteristic at or near the unsprung resonance frequency is improved.

Figure 12:
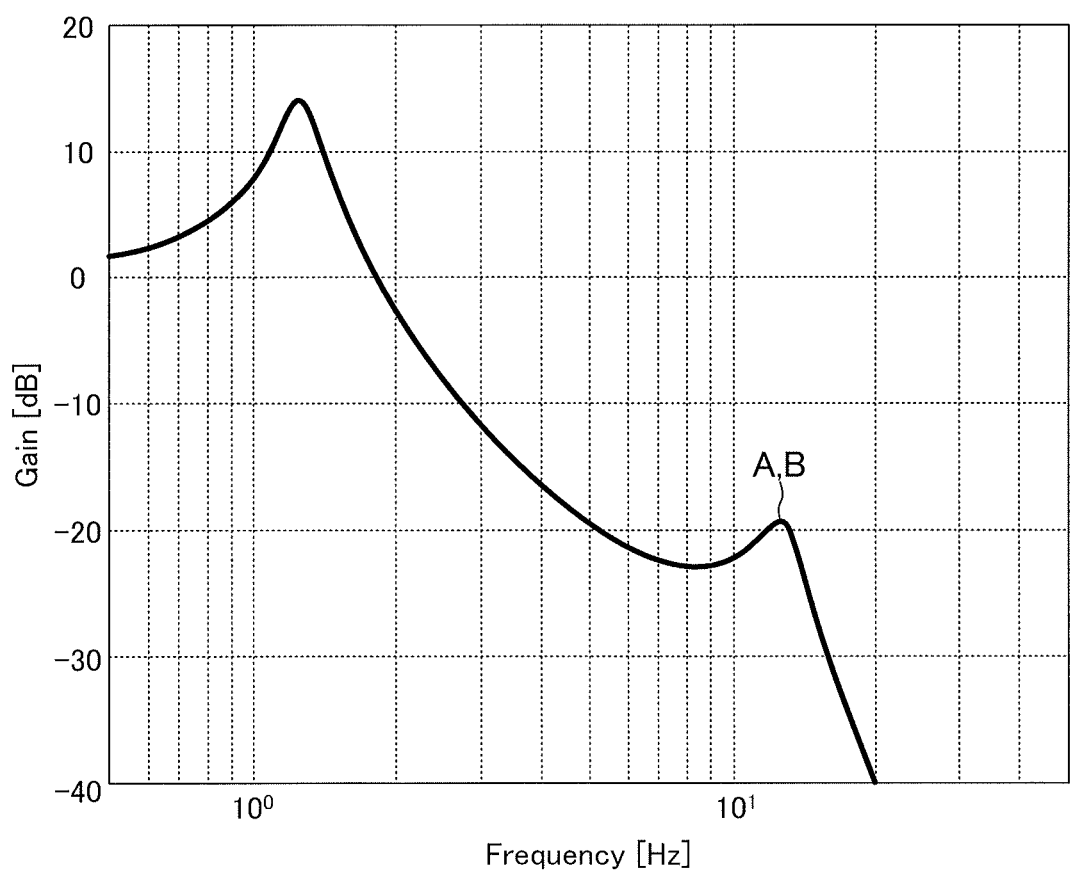
FIG. 12 is a graph for comparing the sprung vibration transfer characteristic of a suspension apparatus including an electric shock absorber controlled by the method shown in the third embodiment and the sprung vibration transfer characteristic of a suspension apparatus including a conventional shock absorber.

FIG. 12 is a graph showing the sprung vibration transfer characteristic of the suspension apparatus including the electrical shock absorber 30 to which the electric circuit 103 of the present embodiment is connected and the sprung vibration transfer characteristic of a suspension apparatus including a conventional shock absorber. In FIG. 12, a curve A is a gain diagram representing the sprung vibration transfer characteristic of the suspension apparatus of the present embodiment. A curve B is a gain diagram representing the sprung vibration transfer characteristic of the suspension apparatus including the conventional shock absorber. As can be understood from FIG. 12, the lines A and B exhibit almost the same sprung vibration transfer characteristic in all frequency bands. This shows that the sprung vibration transfer characteristic of the suspension apparatus of the present embodiment has been improved particularly for vibrations at or near the unsprung resonance frequency through elimination of the influence of the inertia of the rotation body.

d. Fourth Embodiment

Figure 13:
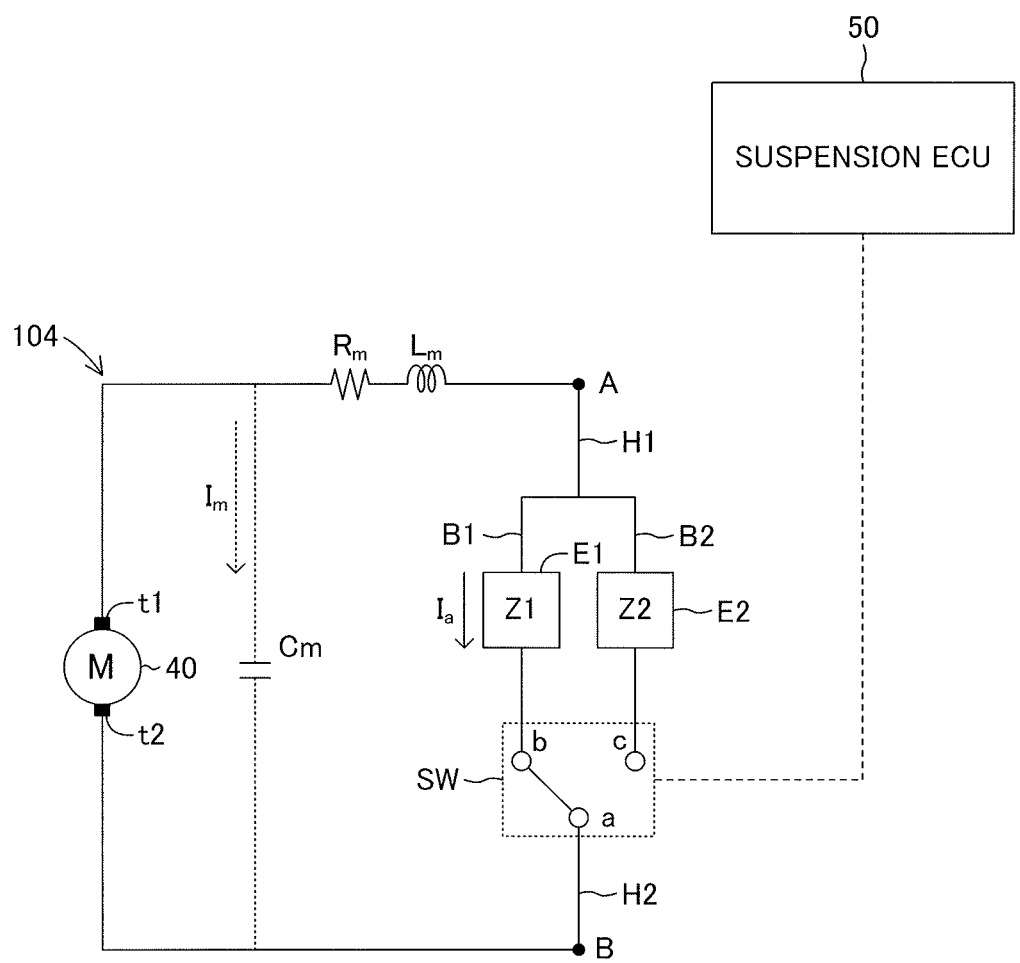
FIG. 13 is a circuit diagram of an electric circuit according to a fourth embodiment.

Next, a fourth embodiment of the present invention will be described. FIG. 13 is a circuit diagram showing an electric circuit 104 according to the present embodiment. As shown in FIG. 13, the electric circuit 104 according to the present embodiment includes a first connection path H1 which is connected to the first electricity supply terminal t1 of the motor 40 and a second connection path H2 which is connected to the second electricity supply terminal t2 of the motor 40. A first branch path B1 and a second branch path B2 are connected to the first connection path H1. A first element E1 having an impedance Z1 (a first impedance) is provided in the first branch path B1. A second element E2 having an impedance of Z2 (a second impedance) is provided in the second branch path B2. In addition, a switch SW (connection state changeover device) is connected to the second connection path H2. The switch SW includes three terminals (terminal a, terminal b, and terminal c) and one movable piece. The terminal a is connected to the second connection path H2. The terminal b is connected to the first branch path B1, and the terminal c is connected to the second branch path B2. The movable piece selectively connects the terminal a to either the terminal b or c. Therefore, the switch SW selectively connects either the first element E1 or the second element E2 to the electric circuit 104. Operation of the switch SW is controlled by the suspension ECU 50.

In addition, an inertia corresponding capacitor Cm is imaginarily connected in parallel to this electric circuit 104. The inertia corresponding capacitor Cm has a capacitance $(J/K_m^2)$ corresponding to the inertial force (inertial moment) of the rotation body (the ball screw shaft 36 and the rotor of the motor 40) which rotates with the extension and contraction of the electric shock absorber 30. Notably, in FIG. 13, $L_m$ represents the motor inductance and $R_m$ represents the internal resistance of the motor 40.

In the case where an inductive electromotive force is generated by the motor 40, the generated current flows through the electric circuit 104. When the first element E1 is connected to the electric circuit 104, the generated current flows through the first element E1. The impedance Z1 of the first element E1 is set in advance such that the vibration of the sprung member is effectively damped by the damping force generated as a result of the generated current flowing through the motor 40 and the electric circuit 104 when the first element E1 is connected to the electric circuit 104. When the second element E2 is connected to the electric circuit 104, the generated current flows through the second element E2. The impedance Z2 of the second element E2 is set in advance such that the impedance (including the motor inductance $L_m$ and the internal resistance $R_m$) of the electric circuit 104 to which the second element E2 is connected becomes smaller than the impedance of the inertia corresponding capacitor Cm.

Next, there will be described how the generated current flows through the electric circuit 104. An inductive electromotive force (counter electromotive force) is generated when the electric shock absorber 30 extends or contracts and the rotor of the motor 40 is rotated as a result of an approaching or separating motion between the sprung member and the unsprung member. The direction of the inductive electromotive force changes depending on whether the electric shock absorber 30 is extended or compressed. For example, in the case where the sprung member and the unsprung member approach whereby the electric shock absorber 30 is compressed and the rotor of the motor 40 rotates in one direction, the first electricity supply terminal t1 of the motor 40 assumes a high potential, and the second electricity supply terminal t2 thereof assumes a low potential. In contrast, in the case where the sprung member and the unsprung member separate whereby the electric shock absorber 30 is extended and the rotor of the motor 40 rotates in the opposite direction, the second electricity supply terminal t2 of the motor 40 assumes a high potential, and the first electricity supply terminal t1 assumes a low potential.

Accordingly, in the case where the electric shock absorber 30 is compressed, the generated current flows from the first electricity supply terminal t1 of the motor 40 toward the second electricity supply terminal t2 thereof while passing through the first connection path H1, the first element E1 or the second element E2, and the second connection path H2. In contrast, in the case where the electric shock absorber 30 is extended, the generated current flows from the second electricity supply terminal t2 of the motor 40 toward the first electricity supply terminal t1 thereof while passing through the second connection path H2, the first element E1 or the second element E2, and the first connection path H1. That is, depending on whether the electric shock absorber 30 is compressed or extended, the direction in which the generated current flows through the electric circuit 104 changes.

As a result of the generated current flowing through the motor 40 and the electric circuit 104, there is generated a motor torque which acts in the direction opposite the rotation direction of the rotor of the motor 40. This motor torque acts as a damping force against the vibrations between the sprung and unsprung members caused by the approaching and separating motions between the sprung and unsprung members.

The electric shock absorber 30 according to the present embodiment also includes a rotation body (the ball screw shaft 36 and the rotor of the motor 40) which rotates with the extension and contraction (compression) thereof. Accordingly, the generated current contributing to generation of the damping force and the inertia corresponding current $I_m$ which represents the inertial force of the rotation body flow through the motor 40 and the electric circuit 104. The inertial force of the rotation body represented by the inertia corresponding current $I_m$ exerts an adverse effect on the damping force. Consequently, the sprung vibration transfer characteristic for vibrations at or near the unsprung resonance frequency deteriorates.

The inertia corresponding current $I_m$ is represented by a current flowing through the inertia corresponding capacitor Cm which is imaginarily connected in parallel to electric circuit 104. In the present embodiment, the suspension ECU 50 computes the inertia corresponding current $I_m$ and the generated current (normal current) $I_a$ that flows through the motor 40 and the electric circuit 104 when the first element E1 is connected to the electric circuit 104, and controls operation of the switch SW on the basis of the magnitude relation between the computed inertia corresponding current $I_m$ and the normal current $I_a$, thereby reducing the influence of the inertia corresponding current $I_m$ upon the generated current contributing to the generation of the damping force. Through such control of operation of the switch SW, the inertia corresponding current $I_m$ is reduced.

Figure 14:
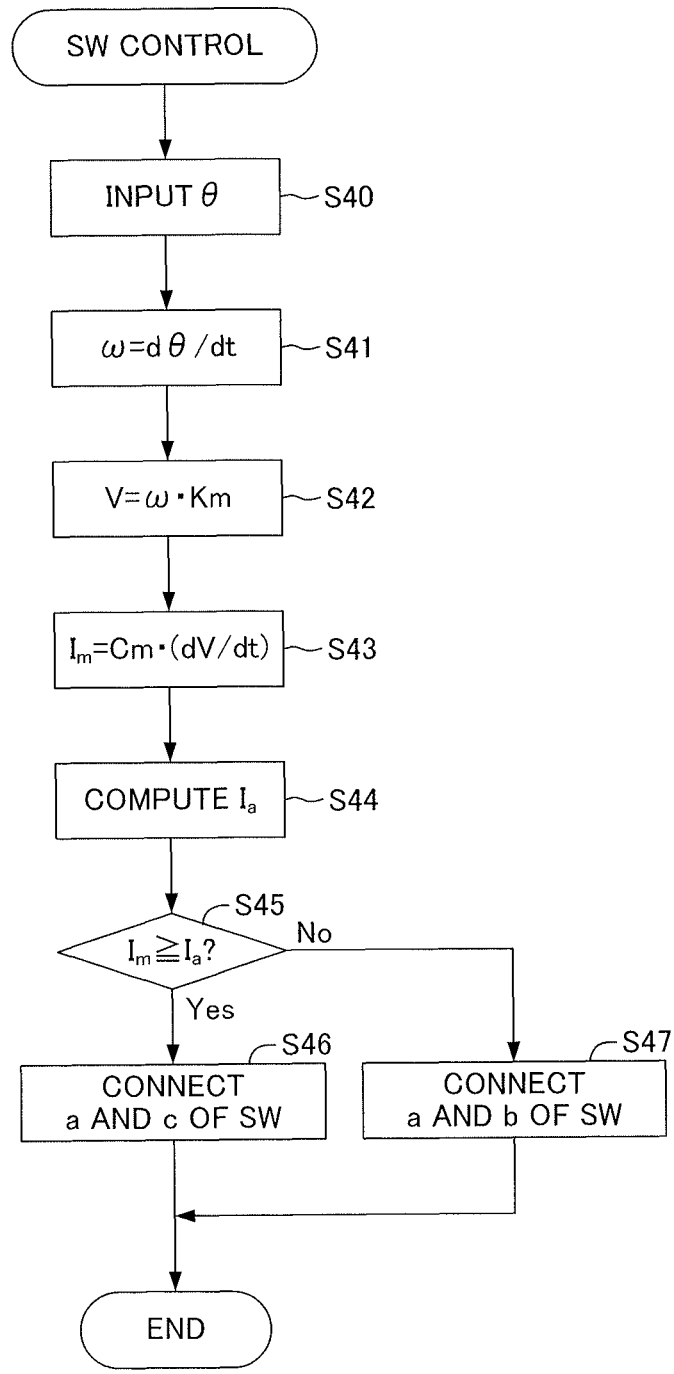
FIG. 14 is a flowchart showing an example of a switch control routine executed by the suspension ECU in the fourth embodiment.

FIG. 14 is a flowchart showing an example of the switch control routine executed by the suspension ECU 50 in order to control operation of the switch SW. Upon start of the switch control routine, the suspension ECU 50 first receives the rotational angle θ of the motor 40 (rotor) from the rotational angle sensor 63 (S40). Next, the suspension ECU 50 differentiates the received motor rotational angle θ with respect to time in order to compute the motor rotational angular speed ω (S41). Next, the suspension ECU 50 multiplies the motor rotational angular speed ω by a motor torque constant $K_m$ so as to compute an inductive electromotive force V (S42). Next, the suspension ECU 50 differentiates the inductive electromotive force V with respect to time, and multiplies the differential value by the capacitance $C_m$ of the inertia corresponding capacitor Cm in order to compute the inertia corresponding current $I_m$ flowing through the imaginary inertia corresponding capacitor Cm (S43).

Next the suspension ECU 50 computes the normal current $I_a$; namely, the generated current which flows through the motor 40 and the electric circuit 104 when the first element E1 is connected to the electric circuit 104 (S44). The impedance of the electric circuit 104 is represented by the impedance Z1 of the first element E1, the inductance $L_m$ and the internal resistance $R_m$ of the motor 40. When the inductance component and the resistance component of the impedance of the electric circuit 104 are represented by L and R respectively, the inductive electromotive force V is expressed by the following expression (21).

$$V = K_m \cdot \omega = L\frac{dI_a}{dt} + R \cdot I_a \quad (21)$$

Conducting Laplace transformation for the expression (21) gives the expression (22).

$$I_a(s) = \frac{K_m \cdot \Omega(s)}{Ls+R} = \frac{1}{Ls+R}V(s) = G(s)V(s) \quad (22)$$

The expression (22) shows that a transfer function G(s) represents the relation between the inductive electromotive force V, which serves as the input of the function, and the normal current $I_a$, which serves as the output of the function. The transfer function G(s) is a first-order lag transfer function. The first-order lag transfer function represents a low-pass filter. Accordingly, the normal current $I_a$ can be obtained on the basis of the expression (22) given above; for example, by passing the inductive electromotive force V through a low-pass filter which represents the transfer function G(s) of the expression (22).

Next, the suspension ECU 50 determines whether the inertia corresponding current $I_m$ is equal to or larger than the normal current $I_a$ (S45). In the case where the inertia corresponding current $I_m$ is smaller than the normal current $I_a$ (S45: No), the suspension ECU 50 outputs a control signal to the switch SW such that the terminals a and b of the switch SW are connected to each other (S47). After this, the suspension ECU 50 ends the current execution of this routine. In the case where the inertia corresponding current $I_m$ is equal to or larger than the normal current $I_a$ (S45: Yes), the suspension ECU 50 outputs a control signal to the switch SW such that the terminals a and c of the switch SW are connected to each other (S46). After this, the suspension ECU 50 ends the current execution of this routine.

Through repetitive performance of the above-described switch control, the first element EL1 is connected to the electric circuit 104 in the case where the inertia corresponding current $I_m$ is smaller than the normal current $I_a$. In contrast, in the case where the inertia corresponding current $I_m$ is larger than the normal current $I_a$, the second element EL2 is connected to the electric circuit 104.

Figure 15:
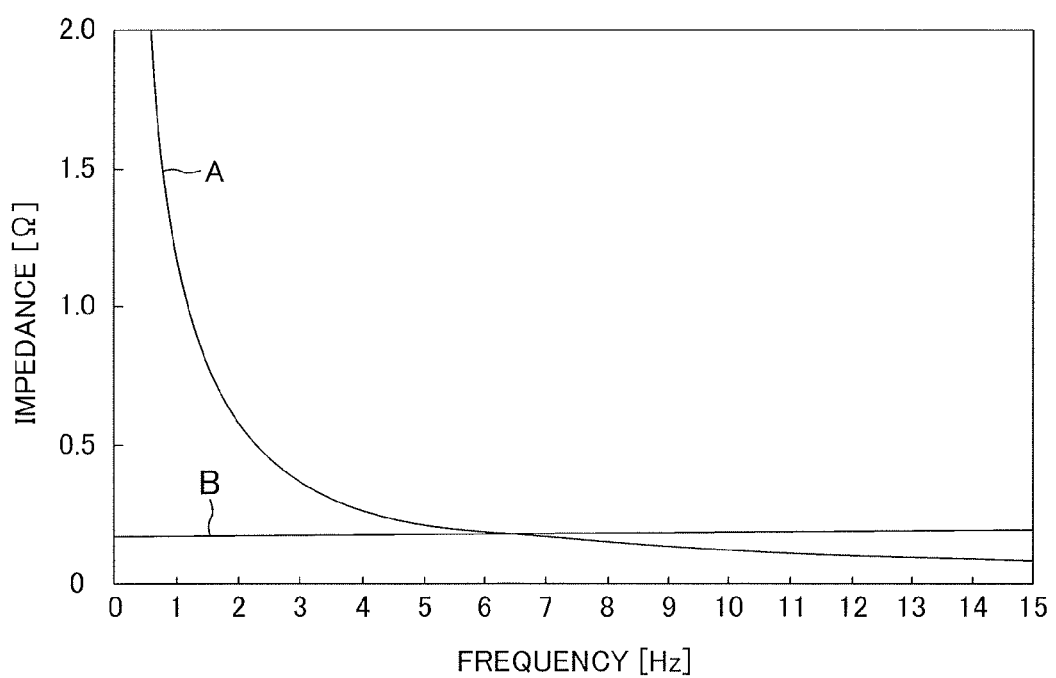
FIG. 15 is a graph for comparing the frequency characteristic of the impedance of an inertia corresponding capacitor Cm and the frequency characteristic of the impedance of the electric circuit according to the fourth embodiment to which a first element is connected.

FIG. 15 is a graph showing the frequency characteristic of the impedance of the inertia corresponding capacitor Cm and the frequency characteristic of the impedance of the electric circuit 104 to which the first element EL1 is connected. In FIG. 15, a curve A shows the frequency characteristic of the impedance of the inertia corresponding capacitor Cm, and a curve B shows the frequency characteristic of the impedance of the electric circuit 104. Notably, a fixed resistor whose resistance is R is used as the first element EL1.

The impedance of the inertia capacitor Cm shown by the curve A is represented by $(1/(\omega C_m))$. ω is the angular frequency ($=2\pi f$) of vibration. The impedance of the inertia corresponding capacitor Cm is inversely proportional to the frequency f. Namely, this impedance decreases as the frequency f increases. Meanwhile, the impedance of the electric circuit 104 shown by the curve B is represented by ($\omega L_m + (R+R_m)$). The impedance of the electric circuit 104 is proportional to the frequency f. Namely, this impedance increases with the frequency f. Accordingly, the impedance of the inertia corresponding capacitor Cm is larger than the impedance of the electric circuit 104 when the frequency f is low. However, the impedance of the inertia corresponding capacitor Cm is smaller than the impedance of the electric circuit 104 when the frequency f is high.

In the present embodiment, as shown in FIG. 15, the impedance of the inertia corresponding capacitor Cm and the impedance of the electric circuit 104 are reversed at a frequency around 7 Hz. Accordingly, in a vibration frequency band at or near the sprung resonance frequency (around 1 Hz), the impedance of the inertia corresponding capacitor Cm is larger than the impedance of the electric circuit 104. On the other hand, in a vibration frequency band at or near the unsprung resonance frequency (around 10 Hz), the impedance of the inertia corresponding capacitor Cm is smaller than the impedance of the electric circuit 104.

In the case where the inertia corresponding current $I_m$ is smaller than the normal current $I_a$, the impedance of the inertia corresponding capacitor Cm is larger than the impedance of the electric circuit 104. In addition, in the same case where the inertia corresponding current $I_m$ is smaller than the normal current $I_a$, since the inertial force represented by the inertia corresponding current $I_m$ exerts only a small degree of adverse effect upon the damping force represented by the normal current $I_a$, there is no need to diminish such an adverse effect. On the other hand, in the case where the impedance of the inertia corresponding capacitor Cm is larger than the impedance of the electric circuit 104, as shown in FIG. 15, the frequency of the vibration input to the electrical shock absorber 30 is considered to be at or near the sprung resonance frequency. As seen from the above, in the case where the inertia corresponding current $I_m$ is smaller than the normal current $I_a$, a vibration at or near the sprung resonance frequency is highly likely to be input to the electric shock absorber 30. In such a case, it can be said that there is no need to diminish an adverse effect exerted by the inertial force represented by the inertia corresponding current $I_m$ upon the damping force.

In such a case, in the present embodiment, the first element E1 is connected to the electric circuit 104. As mentioned previously, the impedance Z1 of the first element E1 is set in advance such that the vibration of the sprung member is effectively damped by the damping force generated as a result of the generated current flowing through the motor 40 and the electric circuit 104 when the first element E1 is connected to the electric circuit 104. Accordingly, when a vibration at or near the sprung resonance frequency is input, the electric shock absorber 30 generates a desired damping force, thereby damping the vibration of the sprung member quickly.

In the case where the inertia corresponding current $I_m$ is larger than the normal current $I_a$, the impedance of the inertia corresponding capacitor Cm is smaller than the impedance of the electric circuit 104. In addition, in the same case where the inertia corresponding current $I_m$ is larger than the normal current $I_a$, since the inertial force represented by the inertia corresponding current $I_m$ exerts a large degree of adverse effect upon the damping force represented by the normal current $I_a$, there is a substantial need to diminish the adverse effect. Furthermore, in the case where the impedance of the inertia corresponding capacitor Cm is smaller than the impedance of the electric circuit 104, as shown in FIG. 15, the frequency of the vibration input to the electrical shock absorber 30 is considered to be at or near the unsprung resonance frequency. As seen from the above, in the case where the inertia corresponding current $I_m$ is larger than the normal current $I_a$, a vibration at or near the sprung resonance frequency is highly likely to be input to the electric shock absorber 30. In such a case, it can be said that there is a substantial need to diminish an adverse effect exerted by the inertial force represented by the inertia corresponding current $I_m$ upon the damping force.

In such a case, in the present embodiment, the second element E2 is connected to the electric circuit 104. As mentioned previously, the impedance Z2 of the second element E2 is set in advance such that the impedance of the electric circuit 104 to which the second element E2 is connected is smaller than the impedance of the inertia corresponding capacitor Cm. Accordingly, when a vibration at or near the unsprung resonance frequency is input, the impedance of the electric circuit 104 is reduced. Thus, a large amount of normal current $I_a$ flows through the motor 40 and the electric circuit 104, and the inertia corresponding current $I_m$ decreases relatively. Since the inertia corresponding current $I_m$ decreases relatively, the adverse effect exerted by the inertial force represented by the inertia corresponding current $I_m$ upon the damping force represented by the normal current $I_a$ is mitigated. Consequently, the sprung vibration transfer characteristic for vibrations at or near the unsprung resonance frequency is improved.

e. Fifth Embodiment

Figure 16:
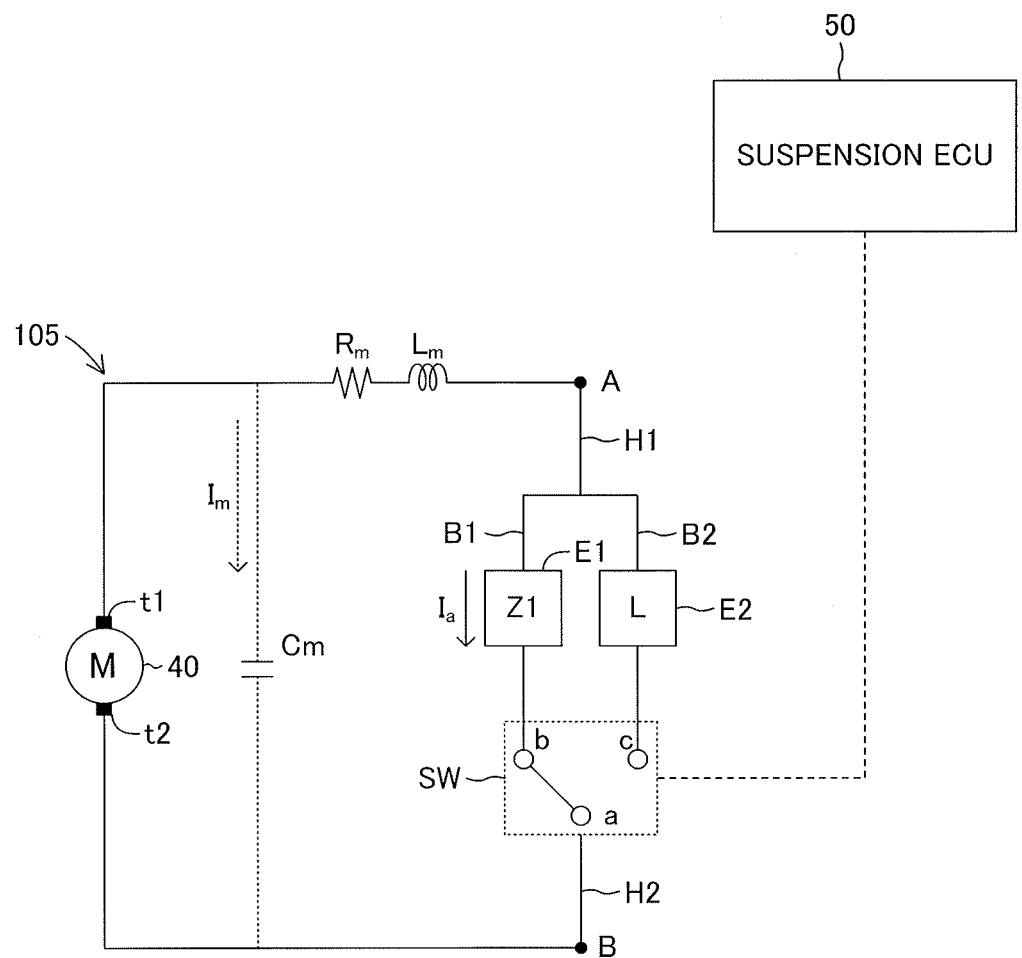
FIG. 16 is a circuit diagram showing an electric circuit according to a fifth embodiment.

FIG. 16 is a circuit diagram showing an electric circuit 105 according to a fifth embodiment of the present invention. This electric circuit 105 is basically the same as the electric circuit 104 described in the fourth embodiment with the exception of the configuration of a second element E2. Accordingly, only the configuration of the second element E2 will be described hereunder, and descriptions of other configurations are omitted.

The second element E2 of the present embodiment is a coil having an inductance component L. In the present embodiment, the inductance L of the coil constituting the second element E2 is determined such that the anti-resonance frequency of a parallel resonance circuit formed by the electric circuit 105 and the inertia corresponding capacitor Cm when the second element E2 is connected to the electric circuit 105 coincides with a target frequency $f_w$, which is determined in advance so as to be equal to or close to the unsprung resonance frequency.

When the rotor of the motor 40 is rotated as a result of the approaching or separating motion between the sprung and unsprung members, an inductive electromotive force is generated at the motor 40 and the generated current flows through the motor 40 and the electric circuit 105. As result of flowing of the generated current, there is generated a motor torque which acts in the direction opposite the rotation direction of the rotor of the motor 40. This motor torque acts as a damping force against the vibrations between the sprung and unsprung members caused by the approaching and separating motions between the sprung and unsprung members. Since the flow of the generated current in the electric circuit 105 is the same as that of the generated current in the electric circuit 104 described in the fourth embodiment, the description thereof is omitted herein.

The electric shock absorber 30 according to the present embodiment also includes a rotation body (the ball screw shaft 36 and the rotor of the motor 40) which rotates with the extension and contraction (compression) thereof. Accordingly, the generated current contributing to generation of the damping force and the inertia corresponding current $I_m$ which represents the inertial force of the rotation body flow through the motor 40 and the electric circuit 105. The inertial force represented by the inertia corresponding current $I_m$ exerts an adverse effect on the damping force. Consequently, the sprung vibration transfer characteristic for vibrations at or near the unsprung resonance frequency deteriorates.

In the present embodiment, the suspension ECU 50 computes the inertia corresponding current $I_m$ and the generated current (normal current) $I_a$ that flows through the motor 40 and the electric circuit 105 when the first element E1 is connected to the electric circuit 105, and controls operation of the switch SW on the basis of the magnitude relation between the computed inertia corresponding current $I_m$ and the normal current $I_a$, thereby improving the sprung vibration characteristic for vibrations at or near the unsprung resonance frequency.

The control routine executed by the suspension ECU 50 in order to control operation of the switch SW is the same as the switch control routine shown in FIG. 13. Hereunder, this routine will be described briefly. The suspension ECU 50 computes the inductive electromotive force V generated by the motor 40, computes the inertia corresponding current $I_m$ on the basis of the inductive electromotive force V, and computes the normal current $I_a$ flowing through the electric circuit 105 to which the first element E1 is connected. The suspension ECU 50 compares the inertia corresponding current $I_m$ with the normal current $I_a$. In the case where the inertia corresponding current $I_m$ is smaller than the normal current $I_a$, the suspension ECU 50 outputs a control signal to the switch SW such that the terminal a and b of the switch SW are connected to each other. In the case where the inertia corresponding current $I_m$ is equal to or larger than the normal current $I_a$, the suspension ECU 50 outputs a control signal to the switch SW such that the terminals a and c of the switch SW are connected to each other.

In the case where the inertia corresponding current $I_m$ is smaller than the normal current $I_a$, a vibration at or near the sprung resonance frequency is highly likely to be input to the electric shock absorber 30. In such a case, it can be said that there is no need to diminish an adverse effect exerted by the inertial force represented by the inertia corresponding current $I_m$ upon the damping force. In this case, in the present embodiment, the first element E1 is connected to the electric circuit 105. The impedance Z1 of the first element E1 is set in advance such that the vibration of the sprung member is effectively damped by the damping force generated as a result of the generated current flowing through the motor 40 and the electric circuit 105 when the first element E1 is connected to the electric circuit 105. Accordingly, when a vibration at or near the sprung resonance frequency is input, the electric shock absorber 30 generates a desired damping force, thereby damping the vibration of the sprung member quickly.

In the case where the inertia corresponding current $I_m$ is larger than the normal current $I_a$, a vibration at or near the unsprung resonance frequency is highly likely to be input to the electric shock absorber 30. In such a case, it can be said that there is a substantial need to diminish an adverse effect exerted by the inertial force represented by the inertia corresponding current $I_m$ upon the damping force. In this case, in the present embodiment, the second element E2 is connected to the electric circuit 105. As mentioned previously, the second element E2 is a coil having an inductance component L which is determined such that the anti-resonance frequency of a parallel resonance circuit formed by the electric circuit 105 and the inertia corresponding capacitor Cm when the second element E2 is connected to the electric circuit 105 coincides with a predetermined frequency which is equal to or close to the unsprung resonance frequency. Accordingly, in the case where a vibration at or near the unsprung resonance frequency is input, anti-resonance occurs between the electric circuit 105 and the inertia corresponding capacitor Cm. As a result of occurrence of the anti-resonance, the circuit impedance at or near the unsprung resonance frequency increases, and it becomes difficult for current to flow through the motor 40 and the electric circuit 105. Thus, the inertia corresponding current $I_m$ and the normal current $I_a$ decrease. With the decrease in the normal current $I_a$ flowing through the electric circuit 105, the damping force generated by the electric shock absorber 30 also decreases. That is, the damping force against the vibrations in the unsprung resonance frequency band decreases. With the decrease in the damping force against the vibrations in the unsprung resonance frequency band, the vibrations in the unsprung resonance frequency band are absorbed by bouncing motions of the unsprung member only. As a result of absorption of the vibrations by bouncing motions of the unsprung member, transfer of the vibrations to the sprung member is suppressed. Thus, the sprung vibration transmissibility (transfer characteristic) at or near the unsprung resonance frequency is improved.

f. Sixth Embodiment

Figure 17:
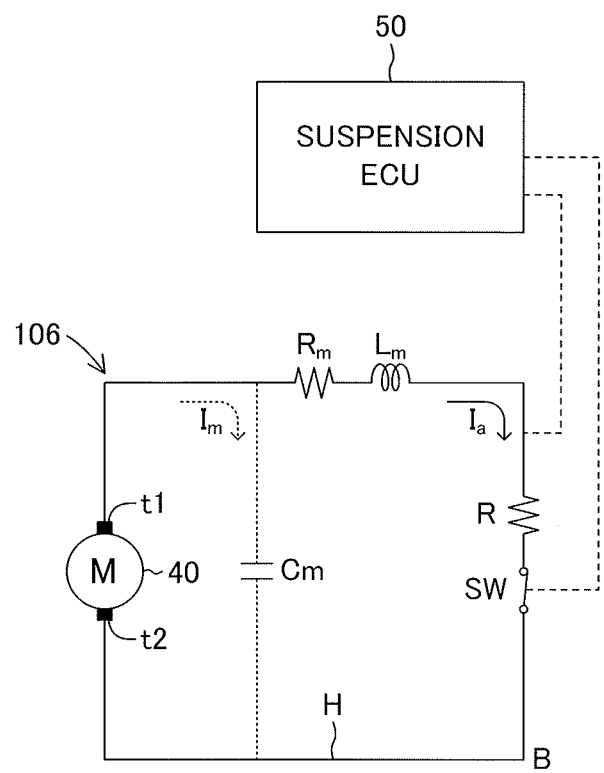
FIG. 17 is a circuit diagram showing an electric circuit according to a sixth embodiment.

FIG. 17 is a circuit diagram showing an electric circuit 106 according to a sixth embodiment of the present invention. The electric circuit 106 includes a main connection path H which connects the first electricity supply terminal t1 and the second electricity supply terminal t2 of the motor 40. An external resistor R and a switch SW which opens/closes the electric circuit 106 are connected to the main connection path H. This switch SW is duty-controlled by the suspension ECU 50. Notably, in FIG. 17, $L_m$ represents the motor inductance and $R_m$ represents the internal resistance of the motor 40. In addition, an inertia corresponding capacitor Cm is imaginarily connected in parallel to the electric circuit 106.

When the rotor of the motor 40 is rotated as a result of the approaching or separating motion between the sprung and unsprung members, an inductive electromotive force is generated at the motor 40 and the generated current flows through the motor 40 and the electric circuit 106. As a result of flowing of the generated current, there is generated a motor torque which acts in the direction opposite the rotation direction of the rotor of the motor 40. This motor torque acts as a damping force against the vibrations between the sprung and unsprung members caused by the approaching and separating motions between the sprung and unsprung members. Since the flow of the generated current in the electric circuit 106 is the same as that of the generated current described in the third embodiment, the description thereof is omitted herein.

The electrical shock absorber 30 of the present embodiment also includes a rotation body (the ball screw shaft 36 and the rotor of the motor 40) which rotates with the extension and contraction (compression) thereof. Accordingly, the generated current contributing to generation of the damping force and the inertia corresponding current $I_m$ which represents the inertial force of the rotation body flow through the motor 40 and the electric circuit 106. The inertial force represented by the inertia corresponding current $I_m$ exerts an adverse effect on the damping force. Consequently, the sprung vibration transfer characteristic for vibrations at or near the unsprung resonance frequency deteriorates.

In the present embodiment, the suspension ECU 50 computes the inertia corresponding current $I_m$ and the generated current $I_a$, and duty-controls the switch SW on the basis of the magnitude relation between the computed inertia corresponding current $I_m$ and the generated current $I_a$, thereby improving the sprung vibration transfer characteristic for vibrations at or near the unsprung resonance frequency.

Figure 18:
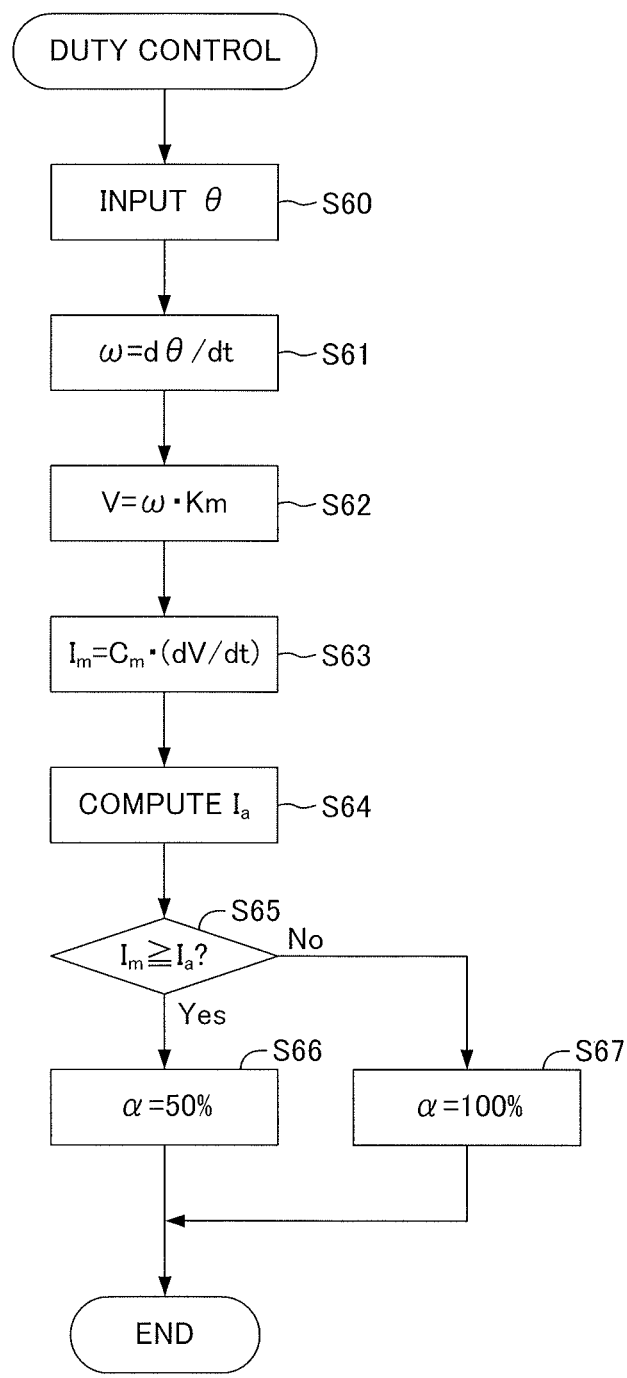
FIG. 18 is a program showing an example of a duty control routine executed by the suspension ECU in the sixth embodiment.
Figure 19:
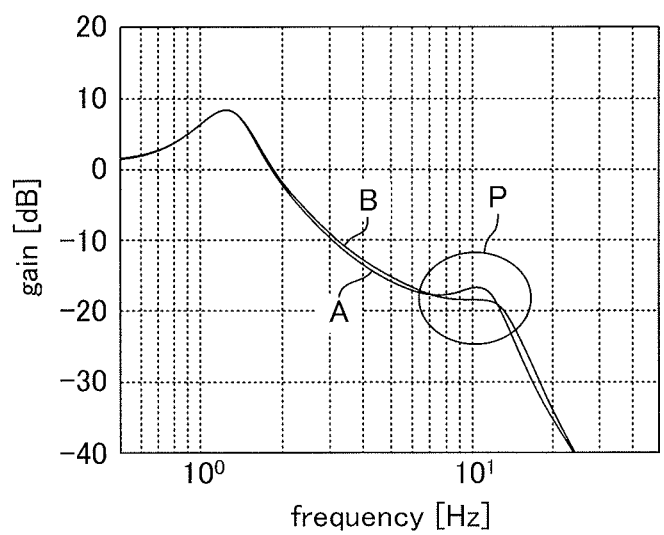
FIG. 19 is a gain diagram showing characteristics regarding the transfer, to a sprung member, of vibration input to a vehicle from a road surface on which the vehicle is traveling.
Figure 20:
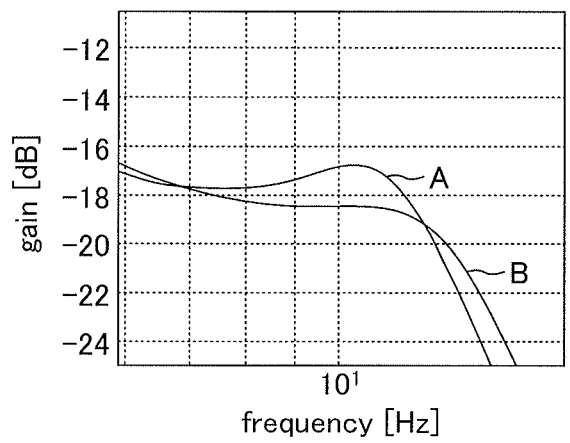
FIG. 20 is an enlarged diagram of a portion P of FIG. 19.

FIG. 18 is a program showing an example of the duty control routine executed by the suspension ECU 50. Upon start of the duty control routine, the suspension ECU 50 first receives the rotational angle θ of the motor 40 (rotor) from the rotational angle sensor 63 (S60). Next, the suspension ECU 50 differentiates the received motor rotational angle θ with respect to time in order to compute the motor rotational angular speed ω (S61). Next, the suspension ECU 50 multiplies the motor rotational angular speed ω by a motor torque constant $K_m$ so as to compute an inductive electromotive force V (S62). Next, the suspension ECU 50 differentiates the inductive electromotive force V with respect to time, and multiplies the differential value by the capacitance $C_m$ of the inertia corresponding capacitor Cm in order to compute the inertia corresponding current $I_m$ flowing through the inertia corresponding capacitor Cm (S63).

Next, the suspension ECU 50 computes the generated current $I_a$ flowing through the electric circuit 106 through use of the same method as that used for computing the normal current $I_a$ in the above-described fourth embodiment (S64).

Next, the suspension ECU 50 determines whether the inertia corresponding current $I_m$ is equal to or larger than the generated current $I_a$ (S65). In the case where the inertia corresponding current $I_m$ is less than the generated current $I_a$ (S65: No), the suspension ECU 50 sets the duty ratio α of the switch SW to 100%, and outputs a control instruction to the switch SW such that the switch SW operates at the set duty ratio α (S67). After this, the suspension ECU 50 ends the current execution of this routine. Meanwhile, in the case where the inertia corresponding current $I_m$ is equal to or larger than the generated current $I_a$ (S65: Yes), the suspension ECU 50 sets the duty ratio α of the switch SW to, for example, 50%, and outputs a control instruction to the switch SW such that the switch SW operates at the set duty ratio α (S66). After this, the suspension ECU ends the current execution of this routine.

In the present embodiment, when the inertia corresponding current $I_m$ is equal to or larger than the generated current $I_a$, the inertia corresponding current and the generated current flowing through the motor 40 and the electric circuit 106 are decreased by decreasing the duty ratio of the switch SW. When the generated current decreases, the damping force also decreases. When the inertia corresponding current $I_m$ is equal to or larger than the generated current $I_a$, presumably a vibration at or near the unsprung resonance frequency is input. Accordingly, the damping force against the vibrations at or near the unsprung resonance frequency decreases. With the decrease in the damping force against the vibrations in the unsprung resonance frequency band, the vibrations in the unsprung resonance frequency band are absorbed by bouncing motions of the unsprung member only. As a result of absorption of the vibrations by bouncing motions of the unsprung member, transfer of the vibrations to the sprung member is suppressed. Thus, the sprung vibration transmissibility at or near the unsprung resonance frequency is improved.

Various embodiments of the present invention have been described above. In each embodiment, the suspension apparatus which generates damping force through use of the electric shock absorber 30 is provided with means for eliminating or lessening the influence of the inertial force of the rotation body included in the electric shock absorber 30 upon the damping force. Specifically, each embodiment provides a suspension apparatus 1 which includes electrical characteristic adjustment part which adjusts the electrical characteristic of the electric circuit 100 so as to reduce the inertia corresponding current $I_m$ flowing through the motor 40 and the electric circuit 100 connected to the motor 40.

In the first embodiment, the electrical characteristic adjustment part includes the inverting amplification circuit 120 and the inertia compensation capacitor Cp. The inverting amplification circuit 120 includes the operational amplifier OP which has the non-inverting input terminal (+) connected to the second electricity supply terminal t2 (one of the two electricity supply terminals of the motor 40), the inverting input terminal (−) connected to the first electricity supply terminal t1 (the other electricity supply terminal of the motor 40), and the output terminal O; the input resistor $R_{in}$; and the feedback resistor Rf. The inertia compensation capacitor Cp is connected to the output terminal O of the operational amplifier OP. According to this configuration, a current which is antiphase to the inertia corresponding current $I_m$ flows through the inertia compensation capacitor Cp. This antiphase current supplied to the electric circuit 101 reduces or cancels out the inertia corresponding current $I_m$. As a result, the sprung vibration transfer characteristic for vibrations at or near the unsprung resonance frequency is improved.

In the second embodiment, the external resistors VR1 and VR2 capable of changing the resistance thereof are connected to the electric circuit 102; and the electrical characteristic adjustment part includes a target damping force computation section (S20) which computes the target damping force which is the target value of the damping force generated by the electric shock absorber 30 on the basis of the vehicle's motion state; a required resistance computation section (S21) which computes, on the basis of the computed target damping force, a required resistance R which is the external resistance required by the electric circuit 102 so as to cause the electric shock absorber 30 to generate the target damping force; and a resistance correction section (S22, S24, and S25) which corrects the resistances of the external resistors VR1 and VR2 such that the combined impedance of the required resistance R and the required inductance $L_h$ is represented by the resistance of the external resistor VR1 or VR2. The required inductance $L_h$ is computed in advance as an external inductance that the electric circuit 102 must have such that the anti-resonance frequency of the parallel resonant circuit formed by the electric circuit 102 and the imaginary inertia corresponding capacitor Cm which is connected in parallel to the electric circuit 102 coincides with a predetermined frequency which is equal to the unsprung resonance frequency or is close to the unsprung resonance frequency. According to this configuration, in the case where the vibration frequency is at or near the unsprung resonance frequency, anti-resonance occurs in the parallel resonant circuit composed of the electric circuit 102 and the inertia corresponding capacitor Cm. As a result of occurrence of anti-resonance, it becomes difficult for current to flow through the electric circuit 102. Thus, the inertia corresponding current $I_m$ and the generated current contributing to the damping force decrease. Consequently, the sprung vibration transfer characteristic for vibrations at or near the unsprung resonance frequency is improved.

In the third embodiment, the electrical characteristic adjustment part includes an inertia corresponding current computation section (S33) which computes the inertia corresponding current $I_m$ which flows through the inertia corresponding capacitor Cm on the basis of the inductive electromotive force and the capacitance of the inertia corresponding capacitor Cm; and the inertia compensation current supply apparatus 300 for supplying the inertia compensation current $I_p$ which is equal in magnitude and is antiphase to the inertia corresponding current $I_m$ to the electric circuit 103. According to this configuration, a current which is equal in magnitude and is antiphase to the inertia corresponding current $I_m$ is supplied to the electric circuit 103. The supplied antiphase current reduces or cancels out the inertia corresponding current $I_m$. Consequently, the sprung vibration transfer characteristic at or near the unsprung resonance frequency is improved.

In the fourth and fifth embodiments, the electrical characteristic adjustment part controls the operation of the connection state changeover apparatus SW on the basis of the magnitude relation between the inertia corresponding current $I_m$ and the normal current $I_a$ (i.e., the generated current which flows through the motor 40 and the electric circuit 104 (105) when the first element E1 is connected to the electric circuit 104 (105)). Specifically, the fourth and fifth embodiments disclose the configuration in which the electrical characteristic adjustment part controls the operation of the connection state changeover apparatus SW such that the first element E1 is connected to the electric circuit 104 (105) when the inertia corresponding current $I_m$ is smaller than the normal current $I_a$, and that the second element E2 is connected to the electric circuit 104 (105) when the inertia corresponding current $I_m$ is larger than the normal current $I_a$.

According to the fourth embodiment, the second element E2 is connected to the electric circuit 104 in the case where the inertia corresponding current $I_m$ is larger than the normal current $I_a$, whereby the impedance of the electric circuit 104 is rendered smaller than the impedance of the inertia corresponding capacitor Cm. Thus, the inertia corresponding current $I_m$ flowing through the inertia corresponding capacitor Cm is decreased. Consequently, the sprung vibration transfer characteristic at or near the unsprung resonance frequency is improved.

According to the fifth embodiment, the second element E2 is connected to the electric circuit 105 in the case where the inertia corresponding current $I_m$ is larger than the normal current $I_a$, whereby anti-resonance occurs in the parallel resonant circuit formed by the electric circuit 105 and the inertia corresponding capacitor Cm in the case where the vibration frequency is at or near the unsprung resonance frequency. As a result of occurrence of anti-resonance, it becomes difficult for current to flow through the motor 40 and the electric circuit 105. Consequently, the sprung vibration transfer characteristic at or near the unsprung resonance frequency is improved.

In the sixth embodiment, the electrical characteristic adjustment part sets the duty ratio of the switch SW to 100% in the case where the inertia corresponding current $I_m$ is smaller than the generated current $I_a$, and sets the duty ratio of the switch SW to a predetermined duty ratio in the case where the inertia corresponding current $I_m$ is larger than the generated current $I_a$, such that the damping force generated by the electric shock absorber 30 becomes equal to or smaller than the predetermined damping force. According to this configuration, in the case where the inertia corresponding current $I_m$ is larger than the normal current $I_a$, the switch SW is duty-controlled so as to reduce the current flowing through the motor 40 and the electric circuit 106. Consequently, the sprung vibration transfer characteristic at or near the unsprung resonance frequency is improved.

The present invention should not be interpreted as being limited to the details disclosed by the above-described embodiments. For example, the shock absorber employed in the above-described embodiments includes a motor and a ball screw mechanism (motion conversion mechanism). However, such a dedicated motion conversion mechanism is not necessarily required. For example, the electric shock absorber which does not require a motion conversion mechanism may be an electric stabilizer apparatus. The electric stabilizer apparatus has a function of suppressing rolling of the vehicle through use of a force generated by a motor. Rolling of the vehicle occurs as a result of approaching and separating motions between the sprung and unsprung members. That is, the electric stabilizer apparatus can be considered to be an electric shock absorber which suppresses rolling vibration caused by the approaching and separating motions between the sprung and unsprung members. The rolling motion of the vehicle is directly transmitted, as a rotational motion, to the rotor of the motor of the electric stabilizer apparatus through a stabilizer bar. Accordingly, the electrical shock absorber does not require a dedicated motion conversion mechanism for converting approaching and separating motions between the sprung and unsprung members to rotational motion of the motor. The present invention can be applied to electrical shock absorbers which do not have such a motion conversion mechanism. As mentioned above, the present invention may be modified in various manners without departing from the scope of the present invention.

The invention claimed is:

1. A suspension apparatus for a vehicle, comprising:
a shock absorber which includes a motor having a stator coupled with one of sprung and unsprung members of the vehicle and a rotor rotatable in relation to the stator, wherein, due to an inductive electromotive force generated when the rotor is rotated as a result of approaching and separating motions between the sprung and unsprung members, an induction current flows through the motor, whereby a damping force is generated;
an electric circuit which establishes electrical connection between a first electricity supply terminal of the motor and a second electricity supply terminal of the motor; and
an electrical characteristic adjustment part which adjusts an electrical characteristic of the electric circuit so as to reduce an inertia corresponding current which is a current flowing through the motor and which represents an inertial force of a rotation body which includes at least the rotor and which rotates as a result of the approaching and separating motions between the sprung and unsprung members, wherein
the electrical characteristic adjustment part comprises:
an inverting amplification circuit which includes an operational amplifier, an input resistor, and a feedback resistor, the operation amplifier having an inverting input terminal connected to the first electricity supply terminal of the motor, a non-inverting input terminal connected to the second electricity supply terminal of the motor, and an output terminal; and
an inertia compensation capacitor connected to the output terminal, and wherein
the input resistor is connected to the inverting input terminal, and
the feedback resistor is provided between the output terminal and the inverting input terminal.

2. A suspension apparatus according to claim 1, wherein the inverting amplification circuit has an amplification factor of 1; and
the inertia compensation capacitor has a capacitance corresponding to the inertia of the rotation body.

3. A suspension apparatus for a vehicle, comprising:
a shock absorber which includes a motor having a stator coupled with one of sprung and unsprung members of the vehicle and a rotor rotatable in relation to the stator, wherein, due to an inductive electromotive force generated when the rotor is rotated as a result of approaching and separating motions between the sprung and unsprung members, an induction current flows through the motor, whereby a damping force is generated;
an electric circuit which establishes electrical connection between a first electricity supply terminal of the motor and a second electricity supply terminal of the motor; and
an electrical characteristic adjustment part which adjusts an electrical characteristic of the electric circuit so as to reduce an inertia corresponding current which is a current flowing through the motor and which represents an inertial force of a rotation body which includes at least the rotor and which rotates as a result of the approaching and separating motions between the sprung and unsprung members, wherein
the electrical characteristic adjustment part adjusts the electrical characteristic of the electric circuit such that an anti-resonance frequency of a parallel resonant circuit formed by the electric circuit and an inertia corresponding capacitor which is imaginarily connected in parallel to the electric circuit and which has a capacitance corresponding to the inertial force of the rotation body coincides with a predetermined frequency equal to or close to an unsprung resonance frequency.

4. A suspension apparatus according to claim 3, wherein an external resistor whose resistance is variable is connected to the electric circuit; and
the electrical characteristic adjustment part comprises:
a target damping force computation section which computes a target damping force which is a target value of the damping force generated by the shock absorber;
a required resistance computation section which computes, on the basis of the target damping force, a required resistance which is an external resistance required by the electric circuit so as to cause the shock absorber to generate the target damping force; and
a resistance correction section which corrects the resistance of the external resistor such that the resistance of the external resistor represents a combined impedance of the required resistance and a required impedance which is determined in advance as an external inductance required by the electric circuit so as to render the anti-resonance frequency coincident with the predetermined frequency equal to or close to the unsprung resonance frequency.

5. A suspension apparatus according to claim 1, wherein
the electric circuit includes a first connection path (H1) electrically connected to the first electricity supply terminal of the motor and a second connection path (H2) electrically connected to the second electricity supply terminal of the motor,
the inverting input terminal connects to the first connection path (HI) via the input resister, and
the non-inverting input terminal connects to the second connection path (H2).

6. A suspension apparatus according to claim 5, wherein
the inverting input terminal connects to the first connection path (H1) through a connection path (L1),
the non-inverting input terminal connects to the second connection path (H2) through a connection path (L2), and
the input resister is provided on the connection path (L1).

7. A suspension apparatus according to claim 6, wherein
the inertia compensation capacitor connects to a connection path (L3), and
a potential of the connection path (L2) is the same as a potential of the connection path (L3).

* * * * *